United States Patent [19]

Sasagaki

[11] Patent Number: 5,687,410
[45] Date of Patent: Nov. 11, 1997

[54] INFORMATION SETTING APPARATUS OF CAMERA

[75] Inventor: Nobuaki Sasagaki, Yokohama, Japan

[73] Assignee: Nikon Corporation, Tokyo, Japan

[21] Appl. No.: 543,858

[22] Filed: Oct. 12, 1995

[30] Foreign Application Priority Data

Oct. 14, 1994 [JP] Japan ................... 6-249342
Oct. 14, 1994 [JP] Japan ................... 6-249370
Oct. 14, 1994 [JP] Japan ................... 6-249381

[51] Int. Cl.$^6$ ........................... G03B 17/00
[52] U.S. Cl. .................. 396/299; 396/238; 396/239
[58] Field of Search ................... 354/289.11, 289.12,
354/402, 400, 403–409, 441, 442; 396/543,
297, 299, 238, 239

[56] References Cited

U.S. PATENT DOCUMENTS

| 5,005,033 | 4/1991 | Miyasaka ................ 396/543 |
| 5,121,152 | 6/1992 | Wagner .................. 354/402 |
| 5,280,319 | 1/1994 | Sato et al. ............ 354/289.12 |

*Primary Examiner*—D. Rutledge

[57] ABSTRACT

An information setting apparatus of a camera, which permits an exposure mode to be set, includes a first setting unit for setting a shutter speed of the camera when the exposure mode is a manual mode, and a second setting unit for setting an aperture value of the camera when the exposure mode is the manual mode. When the exposure mode is one other than the manual mode, third information except for the shutter speed and aperture value is set by either one of the first and second setting units.

19 Claims, 22 Drawing Sheets

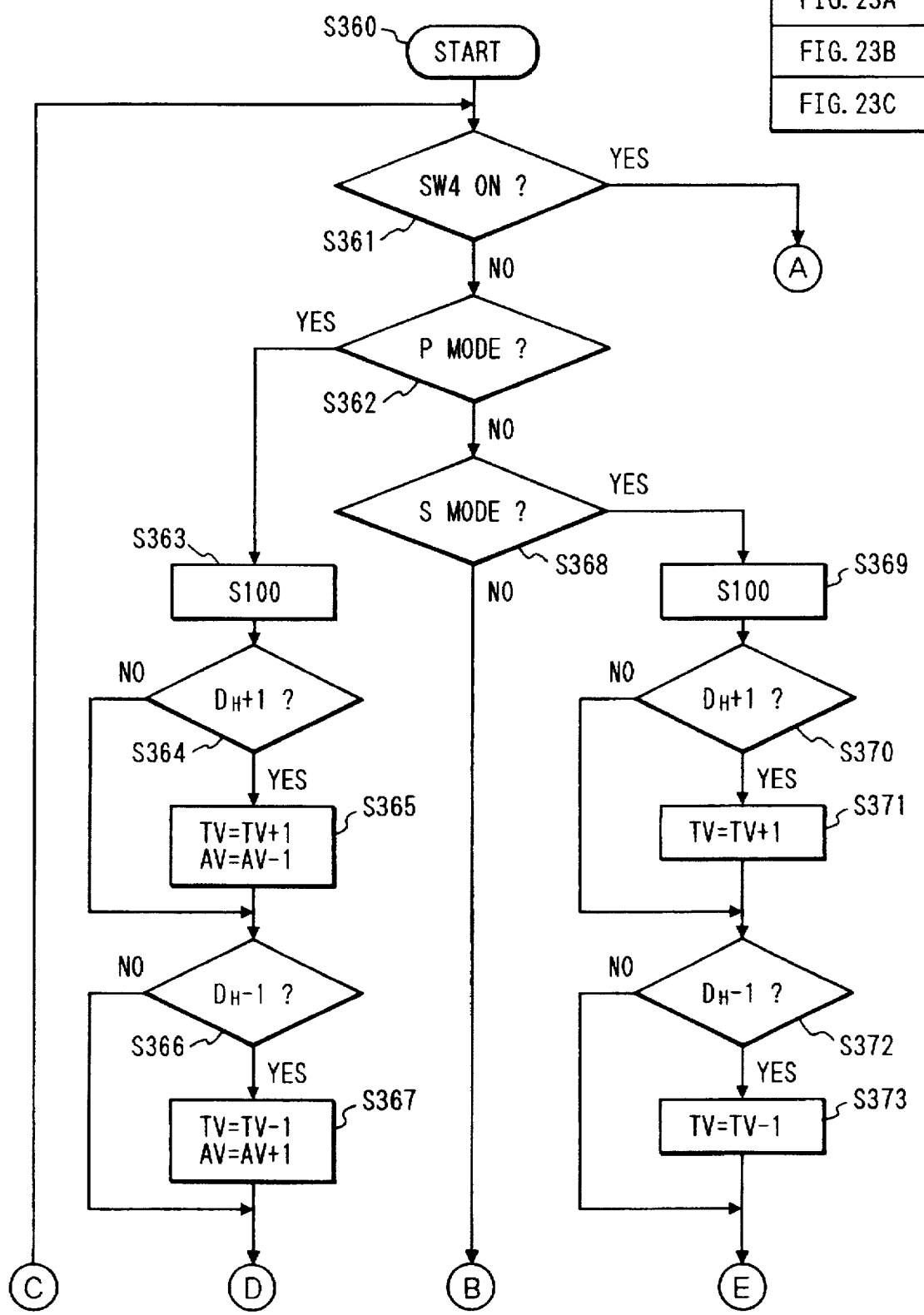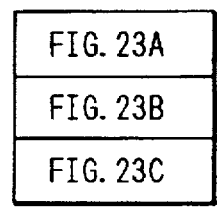

INFORMATION SETTING APPARATUS OF CAMERA

BACKGROUND OF THE INVENTION

1. Field of the Invention

The present invention relates to an information setting apparatus of a camera used in order to set various information such as that needed for shooting in a camera.

2. Related Background Art

For general cameras, specific examples of the information upon shooting that a photographer is to input into camera are exposure information such as shutter speed, aperture value, etc., and shooting information such as setting of an exposure mode, selection of whether continuous shooting is to be effected or not, selection of either continuous or one-shot operation of autofocus drive, setting of film speed, etc.

For setting of the above exposure information or shooting information, the conventional cameras employed such a method that a rotation-controllable or press-controllable manipulation member, such as a setting dial, an up-down button, or a selection button, was provided for each of functions and desired manipulation members out of those are individually manipulated for setting.

There are already proposed manipulation members using a spherical track ball as a manipulation member for inputting necessary information upon shooting of a camera as described above, which is rotated in an arbitrary direction to input information by the direction of rotation, for example as described in the specification of U.S. Pat. No. 5,121,152.

This conventional example applied the track ball only to such an application that, using arbitrariness of a rotation direction of track ball, a distance-measuring point of autofocus was moved to any desired position inside a shooting screen in the finder, for example.

Meanwhile, there are a variety of methods proposed heretofore for inputting or setting various information into the camera in taking a photo; for example, for setting or changing an exposure correction amount, there are methods for properly manipulating a control button, a setting dial, or the like for setting of exposure correction amount.

The conventional methods, proposed heretofore, for correction of exposure, however, required complex manipulation when a photographer desired instantaneous correction during shooting, which was a problem in respect of operability and which included a drawback that the photographer was likely to miss a shutter chance.

Accordingly, the information setting apparatus of the camera is demanded to have any means which enables quick and sure setting of such exposure correction by as easy a manipulation as possible.

Here, control of such exposure correction is necessary when the exposure mode of the camera is the program auto, the shutter priority auto, or the aperture priority auto, but unnecessary when the exposure mode is the manual mode. Thus, this point must be taken into account.

Further, various manipulation which the photographer needs to perform upon shooting is not limited to only the above exposure correction. Thus, another demand is to decrease the number of manipulation members so as to decrease the size and the cost of the whole camera by renewing the whole including the various information settings and shooting operations necessary upon shooting in the whole camera, the operability associated with mount positions of the respective manipulation units to the camera, etc.

Under such circumstances, the inventor has studied utilizing the arbitrariness of rotation direction of a track ball as described above by providing the track ball with a plurality of information setting functions depending upon directions of rotation thereof.

However, when such a track ball was used as an externally controllable manipulation member and a manipulation detecting means for detecting a change due to manipulation thereof in order to change, for example, the shutter speed or aperture value, being the exposure information, freedom of rotation directions could rather cause a trouble.

Namely, even in the case where only the shutter speed was desired to change by rotation of the track ball in one direction, fine shift of rotation direction could cause such misjudgment that it was a rotation direction for changing the aperture value, thereby raising a drawback that the aperture value might also be changed unless taking any countermeasure.

With the shutter speed and the aperture value as setting information as described above, there could occur cases where the aperture value changes, for example, two thirds of a step against a change of one step of the shutter speed, which will have a drawback of making the camera difficult to use. There is thus the demand to overcome such a problem.

Particularly, the manipulation members for setting of information need be constructed so as to be capable of surely changing the contents of information desired to change, but so as never to erroneously change the contents of information not intended to change, which must be taken into consideration.

SUMMARY OF THE INVENTION

An object of the present invention is to provide an information setting apparatus for a camera which permits a photographer to quickly set various information upon shooting of camera, for example exposure correction etc., by easy manipulation and which is excellent in operability and reliability.

Another object of the present invention is to provide an information setting apparatus for a camera which permits the photographer to set various information such as exposure information, shooting information, etc. through an externally controllable manipulation member of necessary minimum complexity, a manipulation method of which is easy to understand, which is free of erroneous setting, and which is excellent in operability and high in reliability.

Still another object of the present invention is to provide an information setting apparatus for a camera which employs a manipulation member, such as a track ball, enabling input and detection in any direction, for setting various information upon shooting of camera, which employs such a manipulation method that when a single manipulation member is arranged as capable of setting a plurality of information contents, the contents of information desired to change can be surely changed, but the contents of information not intended to change are not erroneously changed, and which is excellent in operability and high in reliability.

For achieving the above objects, a first embodiment of the present invention provides an information setting apparatus for a camera, which permits an exposure mode to be set, comprising: first setting means for setting a shutter speed of the camera when the exposure mode is a manual mode; and second setting means for setting an aperture value of the camera when the exposure mode is the manual mode;

wherein when the exposure mode is one other than the manual mode, third information except for the shutter speed and aperture value is set by either one of the first and second setting means.

Preferably, the third information is an exposure correction amount. In this case, the information setting apparatus preferably further comprises a display portion for displaying the exposure correction amount, wherein when the exposure mode is the manual mode, an offset amount deviated from an optimal exposure amount is displayed in the display portion. Preferably, one setting means for setting the exposure correction amount, out of the first and second setting means, comprises a press-controllable control button and the other setting means comprises a rotation manipulation member.

In a further preferred embodiment, the first and second setting means comprise a manipulation member arranged as capable of being displaced in any direction, and manipulation detecting means arranged as capable of detecting each of continuous displacements of the manipulation member in two substantially orthogonal directions and in a direction between the two directions and wherein a displacement in one direction out of the two orthogonal directions effects setting of the shutter speed of the camera while a displacement in the other direction effects setting of the aperture value of the camera. In this case, where the exposure mode is the manual mode and when the manipulation detecting means simultaneously detects the displacements of the manipulation member in the two directions, setting of the shutter speed and the aperture value of the camera is changed at a ratio of 1:1 while a setting operation through the manipulation member is ignored in case of an exposure mode other than the manual mode. Preferably, the manipulation member is a track ball capable of being rotation-displaced in any direction.

The above first embodiment of the present invention enables quick setting of various information, for example exposure correction, by simple manipulation, thereby improving the operability and reliability of information setting apparatus.

A second embodiment of the present invention provides an information setting apparatus for a camera, comprising: an externally controllable manipulation member, which is capable of being displaced in any direction; manipulation detecting means which can detect increase or decrease of each of displacements in at least two directions of the manipulation member; and controlling means for changing a shutter speed and an aperture value of the camera in accordance with the displacement in one direction and the displacement in the other direction of the manipulation member, detected by the manipulation detecting means. In this case, the manipulation member is preferably a track ball capable of being rotation-displaced in any direction.

A third embodiment of the present invention provides an information setting apparatus for a camera, comprising: a first manipulation member being externally controllable and capable of being displaced in any direction; manipulation detecting means which can detect increase or decrease of displacements in at least two directions of the first manipulation member; a second manipulation member provided separately from the first manipulation member; and controlling means arranged in such a manner that where the second manipulation member is not manipulated, the controlling means changes each of a shutter speed and an aperture value of the camera in accordance with a displacement in one direction and a displacement in the other direction, of the first manipulation member, detected by the manipulation detecting means and that where the second manipulation member is manipulated, the controlling means performs selection of changeable shooting information except for the shutter speed and the aperture value of the camera in accordance with a displacement in one direction, of the first manipulation member, detected by the manipulation detecting means and also changes the contents of the shooting information selected, in accordance with a displacement in the other direction. In this case, the first manipulation member is preferably a track ball capable of being rotation-displaced in any direction.

A fourth embodiment of the present invention provides an information setting apparatus for a camera, comprising: a manipulation member being externally controllable and capable of being displaced in any direction; manipulation detecting means which can detect a displacement of the manipulation member given by a photographer; first outputting means for outputting a displacement signal according to the displacement of the manipulation member from a detection result of the manipulation detecting means; second outputting means for outputting a conversion signal for effecting conversion of a shooting parameter of the camera, based on the displacement signal output from the first outputting means; controlling means for converting the shooting parameter of the camera according to the conversion signal output from the second outputting means; and ratio changing means for changing a ratio between the displacement signal output from the first outputting means and the conversion signal output from the second outputting means.

Preferably, if the shooting parameter to be changed is either one of the shutter speed and the aperture value, the ratio changing means changes the ratio so that an amount of conversion of the shooting parameter for the displacement of the manipulation member becomes greater than those in the other cases. In another preferred example, if the shooting parameter to be converted is numerical information, the ratio changing means changes the ratio so that an amount of conversion of the shooting parameter for the displacement of the manipulation member becomes greater than those in the other cases. Preferably, the manipulation member is a track ball capable of being rotation-displaced in any direction.

The above second, third, and fourth embodiments of the present invention realize easy setting of various information such as exposure information and shooting information by the externally controllable manipulation member of necessary minimum, size and the manipulation method is easy to recognize, thus improving the operability and reliability of the information setting apparatus.

A fifth embodiment of the present invention provides an information setting apparatus for a camera, comprising: a manipulation member being externally controllable and capable of being displaced in any direction; manipulation detecting means for detecting each of continuous displacements of the manipulation member in two substantially mutually orthogonal directions and in a direction between the two directions to output detection signals; signal outputting means for outputting a first signal consisting of plural pulses as a displacement component in one direction out of the two orthogonal directions and outputting a second signal consisting of plural pulses as a displacement component in the other direction, based on the detection signals output from the manipulation detecting means; and controlling means for updating first and second shooting parameters of the camera, based on the first and second signals, the controlling means being so arranged that when a ratio between the first signal and the second signal is within a first range, the controlling means updates only the first shooting parameter and that when the ratio between the first signal and the second signal is within a second range different from the first range, the controlling means updates only the second shooting parameter.

Preferably, the controlling means inhibits updating of either of the first and second shooting parameters if the ratio between the first signal and the second signal is within a third range outside the first and second ranges. In another preferred example, the controlling means updates the first shooting parameter and the second shooting parameter at a ratio of 1:1 if the ratio between the first signal and the second signal is within a third range outside the first and second ranges. In this case, the first and second shooting parameters are preferably a shutter speed and an aperture value of the camera, respectively. Preferably, the manipulation member is a track ball capable of being rotation-displaced in any direction.

The above fifth embodiment of the present invention uses the manipulation member capable of detecting an input in any direction, such as a track ball, for setting various information upon shooting with camera, and permits the contents of information desired to change to be surely changed where the single manipulation member is arranged to set plural information, thereby improving the operability and reliability of the information setting apparatus.

The above and other objects, features and advantages of the present invention will be explained hereinafter and may be better understood by reference to the drawings and the descriptive matter which follows.

DETAILED DESCRIPTION OF THE PREFERRED EMBODIMENTS

Figure 1:
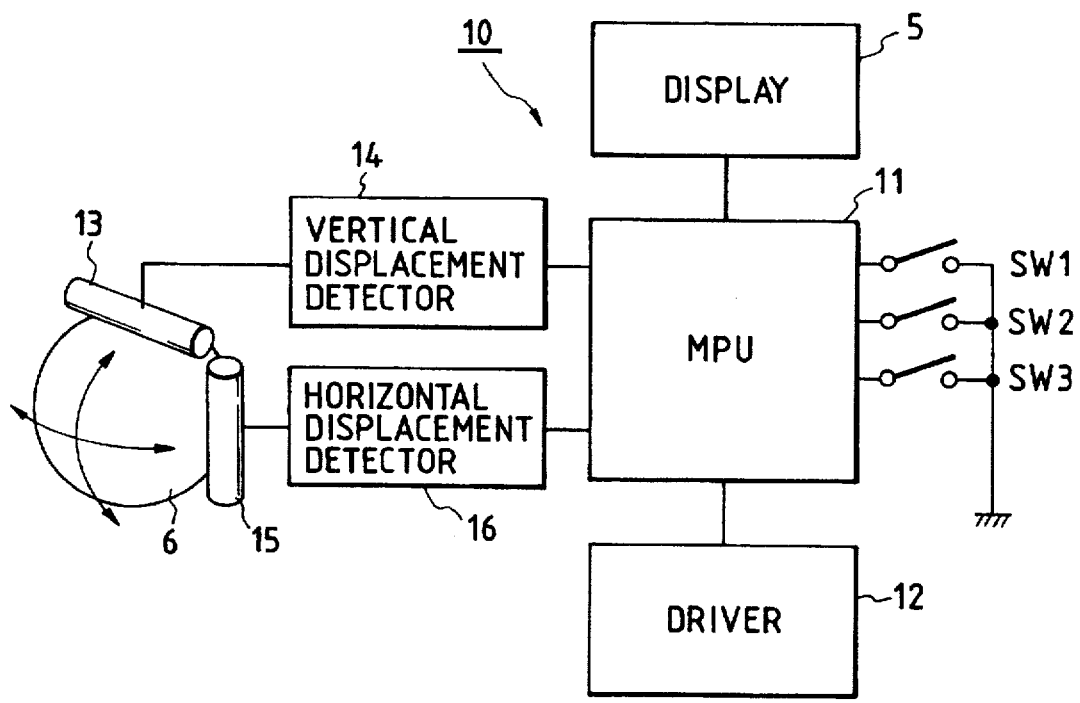
FIG. 1 is a schematic block diagram to show the major structure of the first embodiment of the information setting apparatus for a camera according to the present invention.

Referring now to the drawings wherein like reference numerals designate corresponding or similar elements throughout the several views, the present invention will be described in detail. First, FIGS. 1 to 6 show the first embodiment of the information setting apparatus for a camera according to the present invention. First explained briefly referring to these drawings is the schematic structure of a single-lens reflex camera to which the first embodiment of the present invention is applied, particularly using the top plan view of the camera body shown in FIG. 2.

Although the entire appearance is not illustrated, there are a power switch 3, a release button 4, and a display panel 5 (or an observation window thereof) consisting of a liquid crystal display panel (LCD) etc. as display means, as well known, arranged on the top part of the camera body 2.

In the drawing, reference numeral 6 designates a manipulation member for a photographer to use to input various information, which features the present invention. Here, the present embodiment employs a so-called track ball as the manipulation member 6, which is, for example, spherical and rotatable in any direction and which will be described as a track ball 6.

Namely, the present embodiment employs the track ball 6 arranged as rotatable in a plurality of directions, specifically as capable of being displaced in at least two directions, whereby the single manipulation member can easily and surely function to set various information, which used to be set using a plurality of controlling means, for example setting of the shutter speed and aperture value, setting of exposure correction amount, and setting of various modes.

Here, a preferred example of displacement of the track ball 6 in two mutually orthogonal directions is vertical displacement and horizontal displacement perpendicular to each other. Such common use of manipulation member is preferably arranged as taking account of related conditions, use frequency, etc. of various information.

Figure 2:
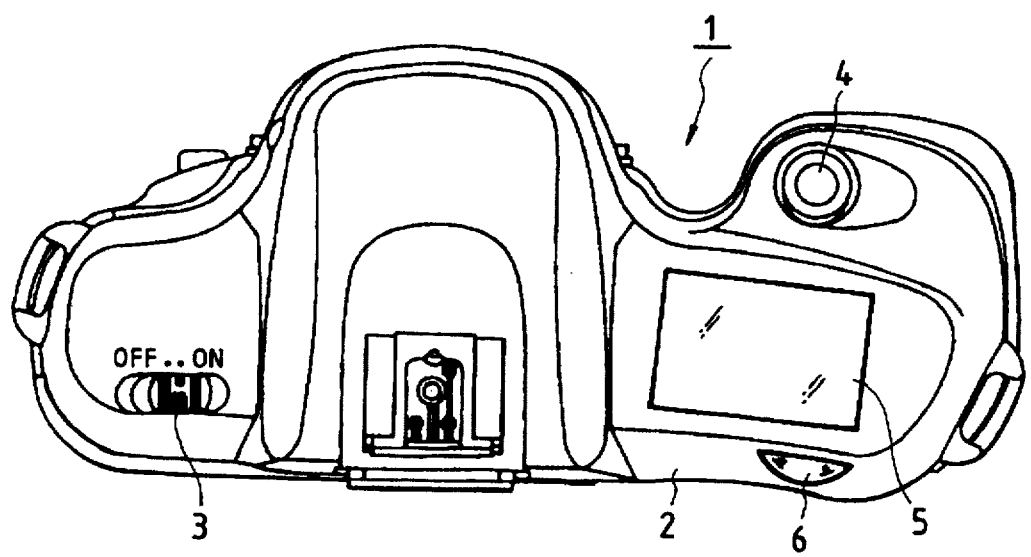
FIG. 2 is a top plan view of a camera to which the first embodiment of the information setting apparatus for a camera according to the present invention is suitably applied.

Although the structure except for that as described above is omitted to explain herein as to the above camera 1 illustrated in FIG. 2, the camera 1, of course, is provided with necessary mechanical components etc. with necessity.

FIG. 1 is a block diagram of the major structure of the information setting apparatus 10 according to the present invention, in which reference numeral 11 designates a microprocessing unit (hereinafter referred to as MPU) for executing control of a camera.

This MPU 11 is connected to the display panel 5, and a drive unit 12 for performing drives of shutter, aperture, winding of film, and so on.

Further, the MPU 11 is connected to a vertical displacement detecting unit 14 for detecting a vertical displacement of the track ball 6 through a detection roller 13 to generate pulses according to an amount of the displacement, and a horizontal displacement detecting unit 16 for detecting a horizontal displacement of the track ball 6 through a detection roller 15 to generate pulses according to an amount of the displacement.

Also, three control switches SW1 to SW3 are connected to the MPU 11.

Here, SW1 is turned on or off through the power switch 3. Further, SW2 is a so-called half-press switch, which is turned on when the release button 4 is pressed down to the middle, and SW3 is a release switch of a full-press switch, which is turned on when the release button 4 is fully depressed.

In the above arrangement, when the track ball 6 is rotated, the detection roller 13 detects an amount of rotation in the vertical direction and the rotation roller 15 detects an amount of rotation in the horizontal direction. The vertical displacement detecting unit 14 and horizontal displacement detecting unit 16 convert the rotation amounts and rotation directions of the respective rollers 13, 15 into pulse signals and transmit the pulse signals to the MPU 11.

Accordingly, only the horizontal displacement detecting unit 16 generates pulses when the track ball 6 is rotated in the horizontal direction; whereas only the vertical displacement detecting unit 14 generates pulses when the track ball 6 is rotated in the vertical direction.

When the track ball is rotated in an oblique direction, both the vertical displacement detecting unit 14 and horizontal displacement detecting unit 16 generate pulses.

Figure 3:
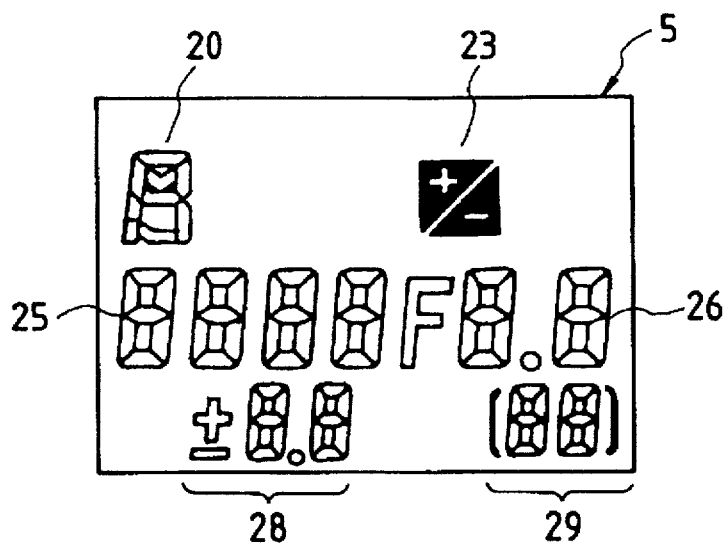
FIG. 3 is a schematic drawing of a case where all display elements are turned on in a display means in the first embodiment of the information setting apparatus for a camera according to the present invention.

FIG. 3 shows a case where all display elements of the display panel 5 being a display unit are displayed on. This display panel 5 is comprised of display elements such as liquid crystal.

Here, reference numerals 20, 23 denote setting and display portions of shooting information, the details of which are as follows.

Namely, reference numeral 20 represents an exposure mode display portion, which is arranged as capable of displaying "P" indicating the program auto, "S" indicating the shutter priority auto, "A" indicating the aperture priority auto, and "M" indicating the manual exposure.

Further, reference numeral 23 denotes a mark for indicating setting of exposure correction.

In addition, reference numerals 25, 26 designate exposure information display portions of the shutter speed and the aperture value, wherein the display portion 25 indicates the shutter speed while the display portion 26 indicates the aperture value.

Further, reference numeral 28 represents a display portion for indicating an exposure correction amount, or an offset amount deviated from an optimal exposure amount in the manual mode (M mode), and reference numeral 29 a display portion for indicating the number of film frames.

Next described is a method for inputting information in this embodiment. Here, Table 1 shows the details of changes when the track ball 6 is rotated in each of the exposure modes of "P", "S", "A", and "M".

TABLE 1

| Exposure mode | Horizontal rotation | Vertical rotation | Oblique rotation |
|---|---|---|---|
| P | Program shift | Exposure correction | Ignored |
| S | Change of shutter speed | Exposure correction | Ignored |
| A | Change of aperture value | Exposure correction | Ignored |
| M | Change of shutter speed | Change of aperture value | Simultaneous change of shutter speed and aperture value |

In detail, when the exposure mode is "P", horizontal rotation of the track ball 6 changes a combination of the shutter speed with the aperture value without changing exposure. That is, a so-called program shift is carried out.

Further, vertical rotation of the track ball 6 sets an exposure correction amount. Oblique rotation is ignored.

When the exposure mode is "S", horizontal rotation of the track ball 6 changes the shutter speed.

Further, vertical rotation sets the exposure correction amount. Oblique rotation is ignored.

When the exposure mode is "A", horizontal rotation of the track ball 6 changes the aperture value.

Further, vertical rotation sets the exposure correction amount, similarly as described above. Oblique rotation is ignored.

When the exposure mode is "M", horizontal rotation of the track ball 6 changes the shutter speed, while the vertical rotation changes the aperture value. Further, oblique rotation simultaneously changes the shutter speed and the aperture value.

Figure 4:
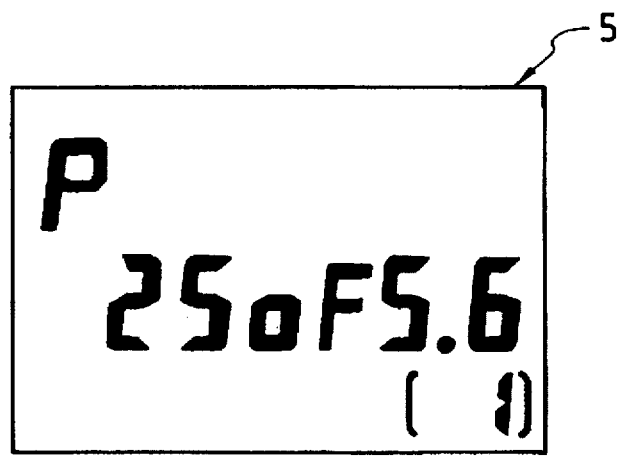
FIG. 4 is a drawing to show an example of a display state in the display means of FIG. 3.

FIG. 4 shows a display state on the display panel 5. This FIG. 4 shows a case where the exposure mode is "P" and no exposure correction is needed. In the other exposure modes only the exposure mode display portion 20 changes, but the other indications are the same.

Here, the exposure mode display portion 20 indicates "P", which is the current exposure mode. Further, the shutter speed display portion 25 and aperture display portion 26 indicate current shutter speed and aperture value, respectively. The film frame number display portion 29 is also turned on to indicate the number of frames.

Since the track ball 6 is protecting a little out of the camera body 2 as is apparent from FIG. 2, the track ball 6 is preferably shaped so as to match with the contour of the camera body 2 in order to prevent the track ball 6 from being erroneously rotated, or is preferably arranged not to rotate unless it is actively rotated. As another example, the track ball 6 may be arranged to be rotated when pressed upon manipulation.

Figure 5:
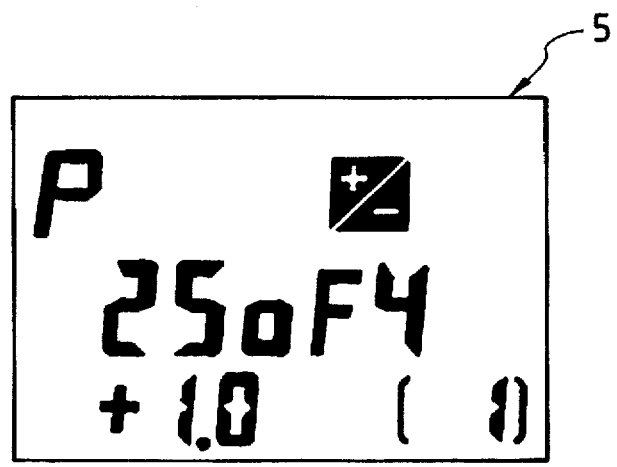
FIG. 5 is a drawing to show an example of display in the program mode by the display means of FIG. 3.

FIG. 5 is a display state where the exposure mode is the "P" mode in FIG. 4 as described above and the exposure correction is set by vertical rotation of the track ball 6. In the "S" mode or in the "A" mode, only the exposure mode display portion 20 changes, but the other indications are the same.

Differences from FIG. 4 reside in that the exposure correction mark 23 is on and in that the exposure correction amount is indicated in the display portion 28.

Figure 6:
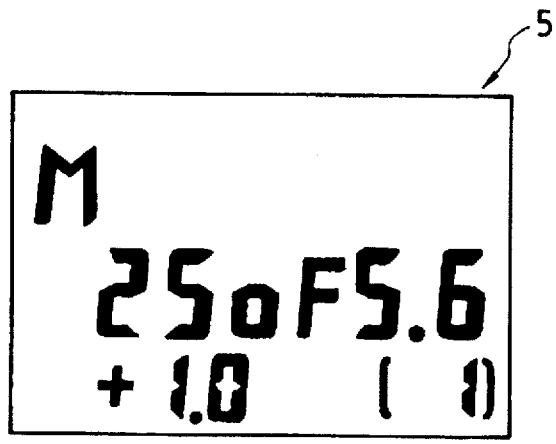
FIG. 6 is a drawing to show an example of display in the manual mode by the display means of FIG. 3.

FIG. 6 shows a display state where the "M" mode is selected as the exposure mode. In this "M" mode, an amount of offset from an optimal exposure amount is indicated in the display portion 28, which is common to display for the exposure correction amount. Since exposure correction is unnecessary in the "M" method, setting thereof is not carried out.

Next, the operation of the present embodiment is explained using the flowcharts of FIGS. 7 to 13.

Figure 7:
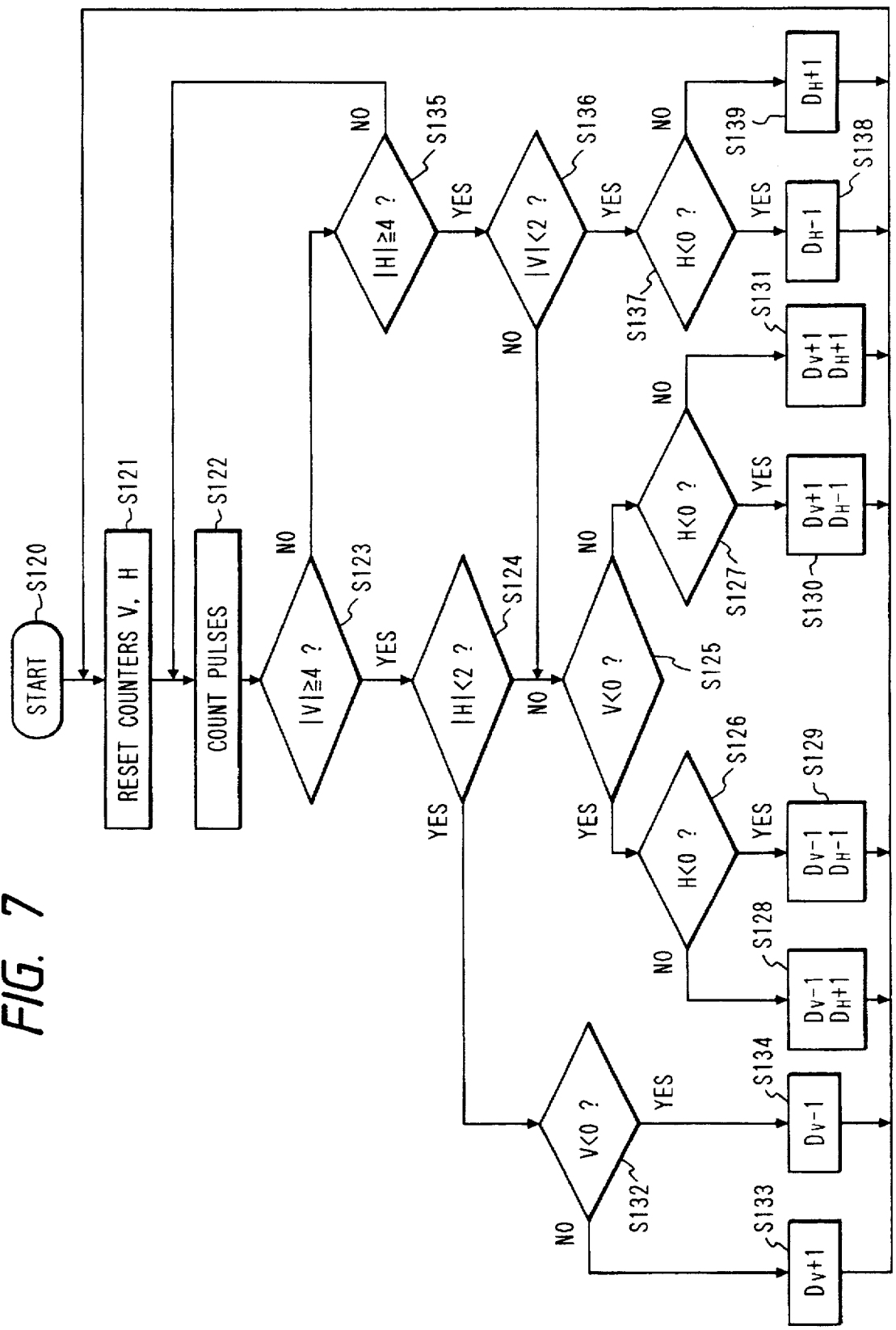
FIG. 7 is a flowchart to show an example of a detection method in the first embodiment of the information setting apparatus for a camera according to the present invention.
Figure 8:
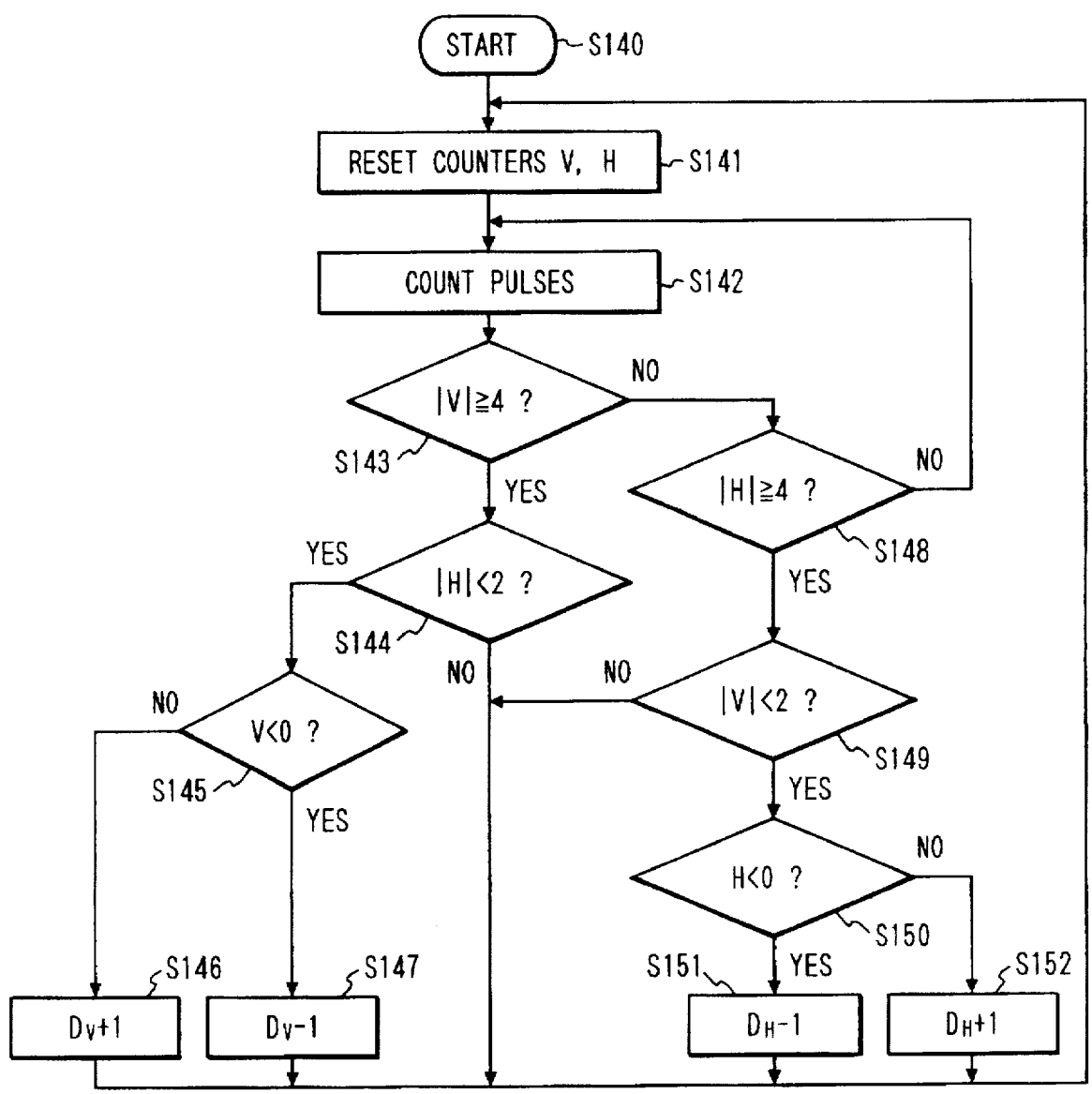
FIG. 8 is a flowchart to show another example of the detection method in the first embodiment of the information setting apparatus for a camera according to the present invention.

Here, the flowcharts shown in FIGS. 7 and 8 show methods for detecting rotation of the track ball 6 in the present embodiment. The present embodiment is provided with two types of detection methods shown in FIGS. 7 and 8, either of which is selectively used depending upon the conditions.

In FIG. 1, when the track ball 6 rotates, an amount of horizontal rotation is detected by the roller 15, and the horizontal displacement detecting unit 16 converts it into pulses and then transmits the pulses to the MPU 11. The MPU 11 includes an up-down counter H on RAM, arranged to increase or decrease depending upon the horizontal displacement pulses thus input.

Similarly, an amount of vertical rotation is detected by the roller 13, and the vertical displacement detecting unit 14 converts it into pulses and sends the pulses to the MPU 11. The MPU 11 includes an up-down counter V on RAM, arranged to increase or decrease depending upon the vertical displacement pulses thus input.

Further, the MPU is provided with signal outputting means $D_V$, $D_H$ for outputting signals to change corresponding setting information in Table 1 in accordance with numbers of pulses of these counters V, H.

Here, the detection method shown in FIG. 7 is arranged to detect a horizontal displacement and a vertical displacement independently of each other and also to detect an oblique displacement, which is used in setting exposure information in the M mode.

Starting at S120, the processor first resets each of the up-down counters V and H on RAM at S121.

At S122 the processor receives signals from the vertical displacement detecting unit 14 and the horizontal displacement detecting unit 16 to increase or decrease the up-down counters V and H.

At S123 it is determined whether the absolute value of the up-down counter V becomes equal to or more than four pulses. If the absolute value is not less than four pulses, S124 is executed to determine whether the absolute value of the up-down counter H is less than two pulses.

If S124 results in determining that the absolute value is not less than two pulses, the processor determines that the rotation is oblique. Then the signs of the up-down counters H and V are checked at S125 to S127. Depending upon whether positive or negative, +1 or −1, respectively, is output to the signal outputting means $D_H$ and $D_V$ at S128 to S131. After that, the flow returns to S121.

When at S124 the up-down counter H is less than two pulses, the processor determines that the rotation is vertical, and then checks the sign of V at S132. The processor outputs +1 or −1 to the signal outputting means $D_V$ at S133 or S134, depending upon whether positive or negative, and then returns to S121.

On the other hand, if at S123 the up-down counter V is less than four pulses, the processor proceeds to S135 to determine whether the absolute value of the up-down counter H is not less than four pulses. If the absolute value is less than four pulses, the processor returns to S122 to continue detection.

If at S135 the up-down counter H is not less than four pulses, the processor proceeds to S136 to determine whether the absolute value of the up-down counter V is less than two pulses. If the absolute value is not less than two pulses, it is determined that the rotation is oblique, and then the processor proceeds to S125. The processing to follow is the same as described above.

If at S136 the up-down counter V is less than two pulses, it is determined that the rotation is horizontal. Then the processor checks the sign of the up-down counter H at S137 and then outputs −1 or +1 to the signal outputting means $D_H$ at S138 or S139, then returns to S121.

In this processing, rotation of the track ball 6 arranged to rotate in any direction is processed Softwarewise as if it is rotated only in the horizontal direction, the vertical direction, and the oblique direction of 45°. The reason is as follows. Since the track ball 6 rotates in any direction, it will also rotate a little in the vertical direction even if only the shutter speed is desired to change by horizontal rotation. The above processing can prevent the aperture value from changing unintentionally.

Supposing the combination of the shutter speed with the aperture value are simultaneously changed in the M mode (manual mode), a combination of two-step change for the shutter speed with one-step change for the aperture value is difficult for the photographer to recognize, and the use frequency thereof is low. Thus, with oblique rotation, the shutter speed and aperture value are arranged to change always at a ratio of 1:1.

Namely, according to the present invention, if rates of first and second signals from the signal outputting means $D_V$, $D_H$ are out of respectively corresponding ranges, but within a third range except therefor, the both parameters are inhibited from changing, thus ignoring the rotation of track ball 6, or the parameters are arranged to change at a ratio of 1:1.

In other words, when the track ball 6 rotates in an intermediate direction between the two rotation directions, either one is selected out of the following choices: (1) to change only either one of the two parameters within a given shift range; (2) to change only either one of the two parameters or to change the two parameters at 1:1; (3) to ignore the rotation in the intermediate direction. The arrangement to selectively use these permits the photographer to perform sure and easy setting change, and also is excellent in reliability.

The detection method shown in FIG. 8 is arranged to detect only the horizontal displacement and the vertical displacement and to ignore the oblique displacement, which is used upon setting of shooting information in the P, S, or A mode.

Starting at S140, the up-down counters V and H on RAM are first reset at S141.

At S142 the processor receives signals from the vertical displacement detecting unit 14 and the horizontal displacement detecting unit 16 to increase or decrease the up-down counters V and H.

At S143 the processor determines whether the absolute value of the up-down counter V becomes equal to or more than four pulses. If the absolute value is not less than four pulses, it is detected at S144 whether the absolute value of the up-down counter H is less than two pulses. If the absolute value is not less than two pulses, the processor judges that the rotation is oblique, and immediately returns to S141 to reset the up-down counters V and H.

If at S144 the up-down counter H is less than two pulses, the processor judges that the rotation is vertical and then checks the sign of the up-down counter V at S145. Depending upon whether the sign is positive or negative, the processor outputs +1 or −1 to the signal outputting means $D_V$ at S146 or S147, and then returns to S141.

If at S143 the up-down counter V is less than four pulses, the processor proceeds to S148 to judge whether the absolute value of the up-down counter H is equal to or more than four pulses. If the absolute value is less than four pulses, the processor returns to S142 to continue detection.

If at S148 the up-down counter H is not less than four pulses, the processor proceeds to S149 to determine whether the absolute value of the up-down counter V is less than two pulses. If the absolute value is not less than two pulses, the processor judges that the rotation is oblique, and then returns to S141, similarly as in the previous case.

If at S149 the up-down counter V is less than two pulses, the processor judges that the rotation is horizontal, and then checks the sign of the up-down counter H at S150. Depending upon whether the sign is positive or negative, the processor outputs +1 or −1 to the signal outputting means $D_H$ at S152 or S151, and then returns to S141.

In this processing, the rotation of the track ball 6 arranged to rotate in any direction is processed softwarewise as if it rotates only in the horizontal direction, in the vertical direction, and in the oblique direction of 45°, and the rotation in the oblique direction is ignored. This is suitable for the cases of such setting of shooting information that there is no chance to simultaneously change two elements by oblique rotation.

In case of horizontal or vertical rotation, even if the rotation direction is shifted a little from the horizontal direction or the vertical direction, rotation is regarded as horizontal or vertical within a certain range. Thus, the user does not have to precisely control the rotation angle and thus, can control the manipulation member readily.

Since in the above embodiment the signal outputting means $D_V$ or $D_H$ is changed by "1" when the up-down counter V or H changes by a plurality of pulses (four pulses in the present embodiment), the apparatus can easily perform such processing as to put oblique rotations of the track ball 6 together into the direction of 45°.

FIGS. 9 to 13 show information setting processing in the respective exposure modes.

Figure 9:
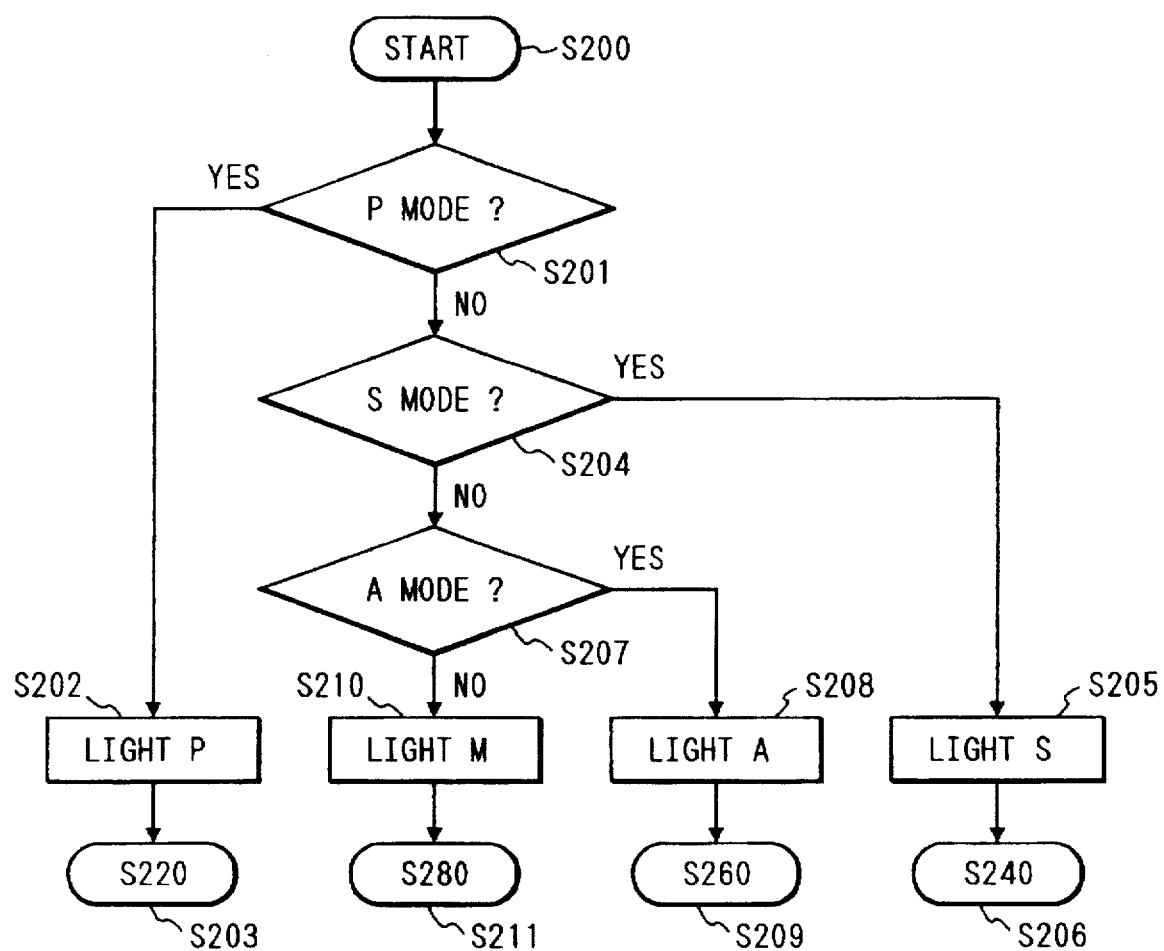
FIG. 9 is a flowchart to show an example of information setting processing in various exposure modes in the first embodiment of the information setting apparatus for a camera according to the present invention.

First, in FIG. 9, the flow starts at S200 and it is determined at S201 whether or not the exposure mode is the P mode. If the P mode is selected, the processor proceeds to S202 to light "P" in the exposure mode display portion 20 and transfers at S203 to the processing at and after S220 as detailed below.

If a mode other than the P mode is selected at S201, the processor proceeds to S204 to determine whether the S mode is selected. If the S mode is selected, the processor proceeds to S205 to light "S" in the display portion 20 and transfers at S206 to the processing at and after S240 as detailed below.

If a mode other than a S mode is selected at S204, the processor proceeds to S207. At S207 the processor determines whether the A mode is selected. If the A mode is selected, the processor proceeds to S208 to light "A" in the display portion 20, and then transfers at S209 to the processing at and after S260 as detailed below.

If the other mode than the A mode is selected at S207, the processor determines that the M mode is selected, lights "M" in the display portion 20, and then transfers at S211 to the processing at and after S280 as detailed below.

Figure 10:
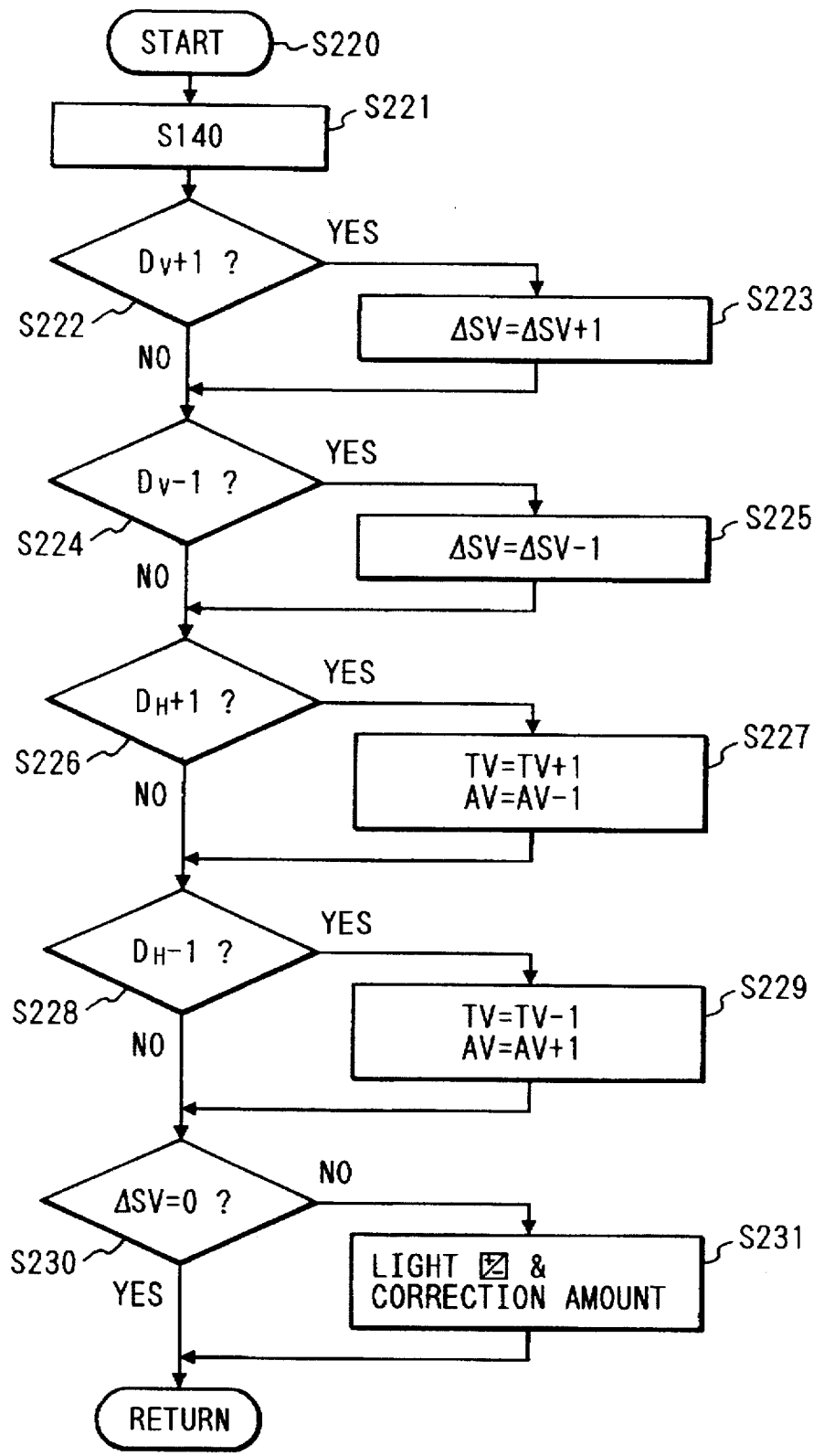
FIG. 10 is a flowchart to show a subroutine called at S203 in FIG. 9.

FIG. 10 shows the processing executed when the P mode of S220 and steps thereafter is confirmed at S203 in FIG. 9. First, at S221 the processor executes the detection of the track ball 6 as described above and shown in FIG. 8. When the detection results in outputting +1 to the signal outputting means $D_V$, the processor proceeds from S222 to S223 to give an increment of +1 to the exposure correction amount.

Similarly, when −1 is output to the signal outputting means $D_V$, the processor proceeds from S224 to S225 to give a decrement of −1 to the exposure correction amount. When +1 is output to the signal outputting means $D_H$, the processor proceeds from S226 to S227 to change the shutter speed and the aperture value each by one step opposite to each other, thus effecting a program shift.

Similarly, when −1 is output to the signal outputting means $D_H$, the processor proceeds from S228 to S229 to effect an opposite program shift to S227. At S230 it is determined whether exposure correction is set. If exposure correction is set, that is, if $\Delta SV \neq 0$, the processor lights the exposure correction display 23 at S231 and also displays an amount of the exposure correction in the display portion 28. This is the state of FIG. 5 as described previously.

Figure 11:
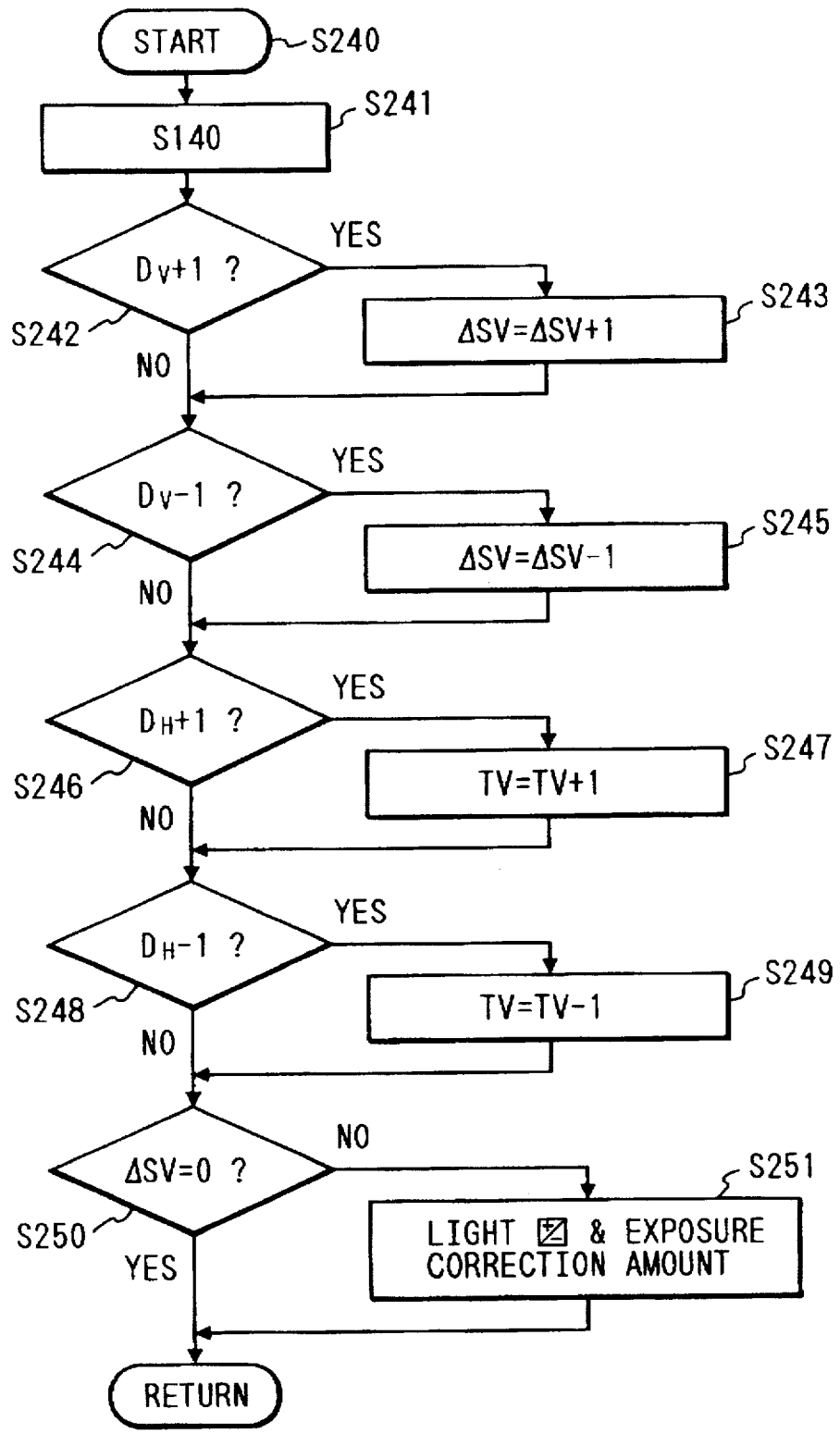
FIG. 11 is a flowchart to show a subroutine called at S206 in FIG. 9.

FIG. 11 shows the processing executed when the S mode of S240 and steps thereafter is confirmed at S206 in FIG. 9, as described above. First, processing of from S241 to S245 is the same as in the case of the P mode in FIG. 10.

When +1 is output to the signal outputting means $D_H$, the processor proceeds from S246 to S247 to change the shutter speed by one step. Similarly, when −1 is output to the signal outputting means $D_H$, the processor proceeds from S248 to S249 to change the shutter speed by one step in the opposite direction to that at S247.

Further, the processing of S250 and steps thereafter is the same as in the case of FIG. 10.

Figure 12:
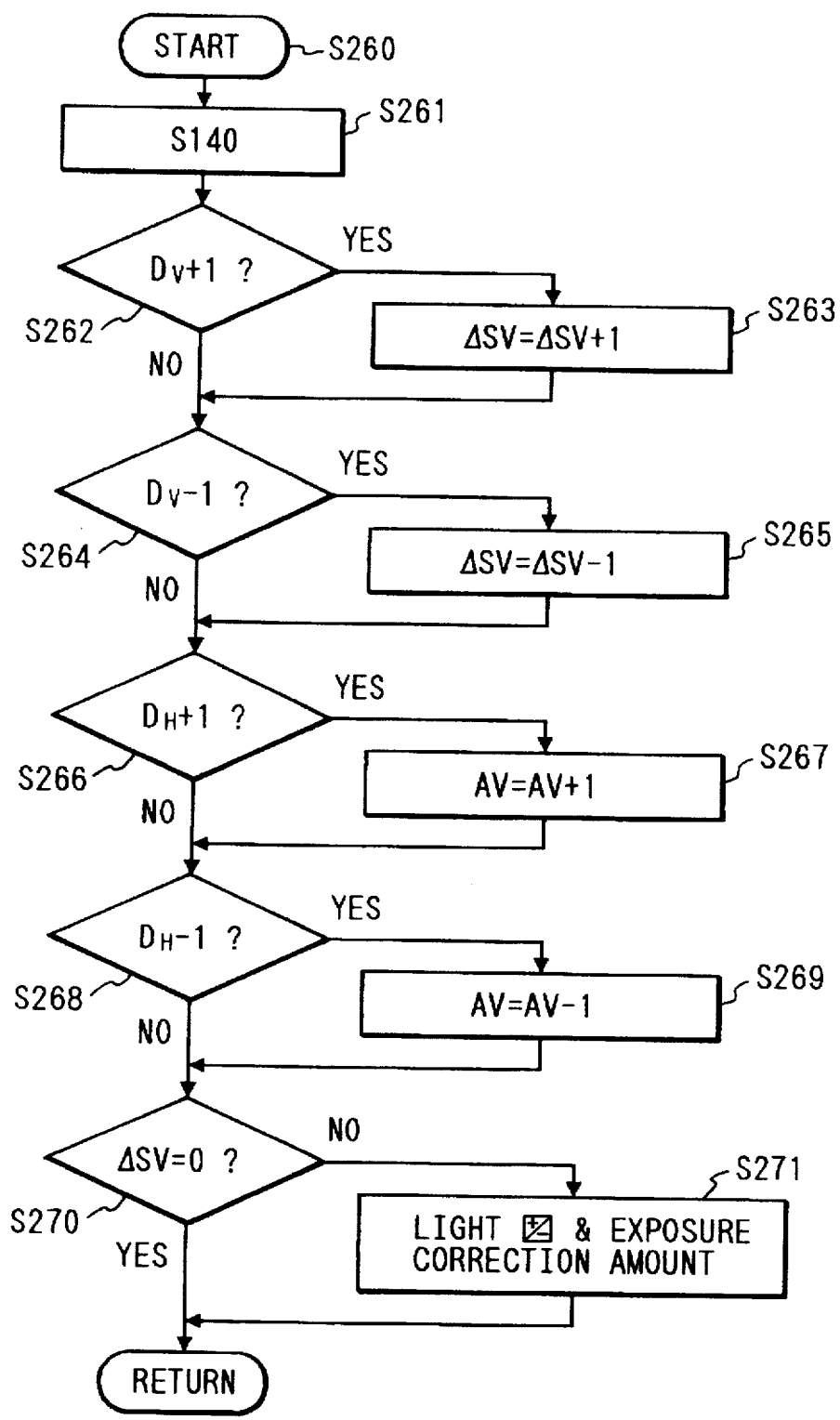
FIG. 12 is a flowchart to show a subroutine called at S209 in FIG. 9.

FIG. 12 shows the processing executed when the A mode of S260 and steps thereafter is confirmed at S209 in FIG. 9. First, the processing of from S261 to S265 is the same as in the case of the P mode in FIG. 10.

When +1 is output to the signal outputting means $D_H$, the processor proceeds from S266 to S267 to change the aperture value by one step. Similarly, when −1 is output to the signal outputting means $D_H$, the processor proceeds from S268 to S269 to change the aperture value by one step in the opposite direction to that at S267.

Further, the processing of S270 and steps thereafter is the same as in the case of FIG. 10.

Figure 13:
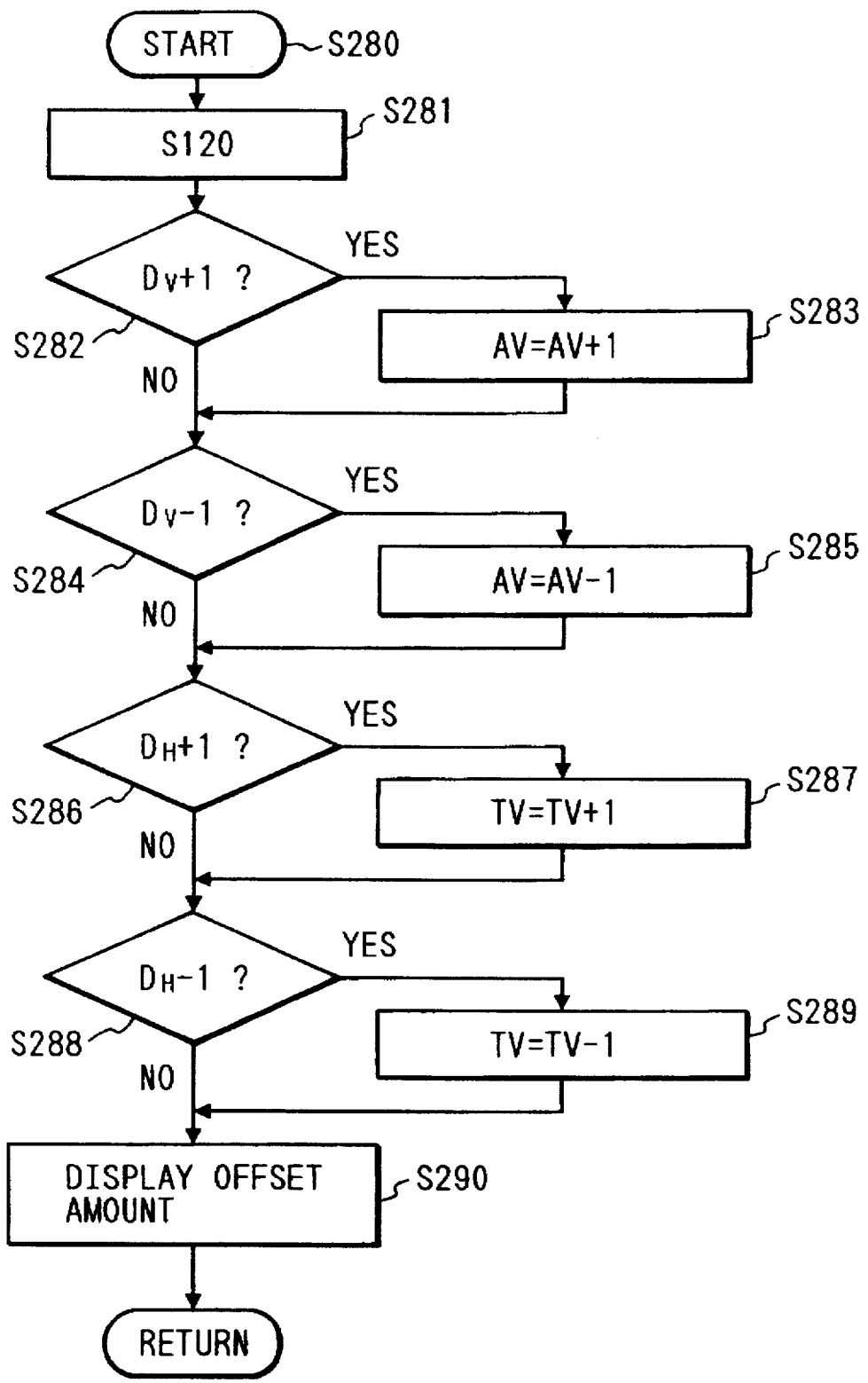
FIG. 13 is a flowchart to show a subroutine called at S211 in FIG. 9.

FIG. 13 shows the processing executed when the M mode of S280 and steps thereafter is confirmed at S211 in FIG. 9. At S281 the processor first performs the detection of track ball 6 including S120 and steps thereafter shown in FIG. 7 and described previously.

When this detection results in outputting +1 to the signal outputting means $D_V$, the processor proceeds from S282 to S283 to change the aperture value by one step. Similarly, when −1 is output to the signal outputting means $D_V$, the processor proceeds from S284 to S285 to change the aperture value by one step in the opposite direction.

When +1 is output to the signal outputting means $D_H$, the processor proceeds from S286 to S287 to change the shutter speed by one step. Similarly, when −1 is output to the signal outputting means $D_H$, the processor proceeds from S288 to S289 to change the shutter speed by one step in the opposite direction to that at S287.

Then the processor displays an offset amount deviated from an optimal exposure amount in the display portion 28 at S290. This state corresponds to FIG. 6.

Since the present first embodiment as detailed above is arranged as capable of setting the aperture value, the shutter speed, and the exposure correction amount by only manipulation of the track ball 6 in the at least two directions substantially perpendicular to each other, the user can quickly set the exposure correction as keeping the holding state of camera 1.

Although the setting of exposure correction is unnecessary in case of the exposure mode being the M mode, the effect equivalent to the exposure correction can be achieved by utilizing the indication of the offset amount deviated from the optimal exposure amount in the display portion 28 in such a way as to change the shutter speed or the aperture value before the indication becomes a desired value.

Further, in case of the P, S, or A mode, the oblique rotation of track ball 6 is ignored using the detection method shown in FIG. 8, upon input of information through the track ball 6, which enables sure setting. In case of the M mode, the shutter speed and the aperture value can be simultaneously changed using the detection method shown in FIG. 7, upon input of information through the track ball 6.

The above embodiment employs the spherical track ball 6 as a manipulation member, which can demonstrate the effect when the exposure mode is a mode other than the manual mode to set the shutter speed and the aperture value and when setting, for example, of exposure correction amount is conducted in an open manipulation direction, and through which the setting of exposure correction amount can be quickly and directly manipulated by direct manipulation upon shooting, thus presenting great advantages.

The manipulation member of this type, however, is not limited to the spherical track ball 6 in the first embodiment described above. For example, the manipulation member may be a semispherical member with a manipulation surface being approximately flat. Any manipulation member can be applicable as long as it can detect increases or decreases of displacements in at least two directions. Further examples are a detecting member of a flat plate provided with directivity by contacts such as fingers so as to permit detection of displacement, a joystick having a manipulation portion, such as a lever, arranged as controllable in two directions, etc.

Further, the first embodiment as described above may be arranged to read the vertical displacement and the horizontal displacement of the track ball 6 as the manipulation member in the reverse way. Further, taking the operability for the photographer into account, the camera 1 may be provided with posture detecting means in such an arrangement that when the photographer changes the posture of camera 1 between the vertical posture and the horizontal posture, changeover is effected between the displacement detection and setting change through the manipulation member to allow easy control.

It is noted that the present invention is by no means limited to the manipulation member such as the track ball 6, but may employ two manipulation members, of course. In this case, examples of the two manipulation members are various press control buttons, such as rotation-controllable setting dials or press-controllable up-down buttons, and other manipulation members.

Figure 14:
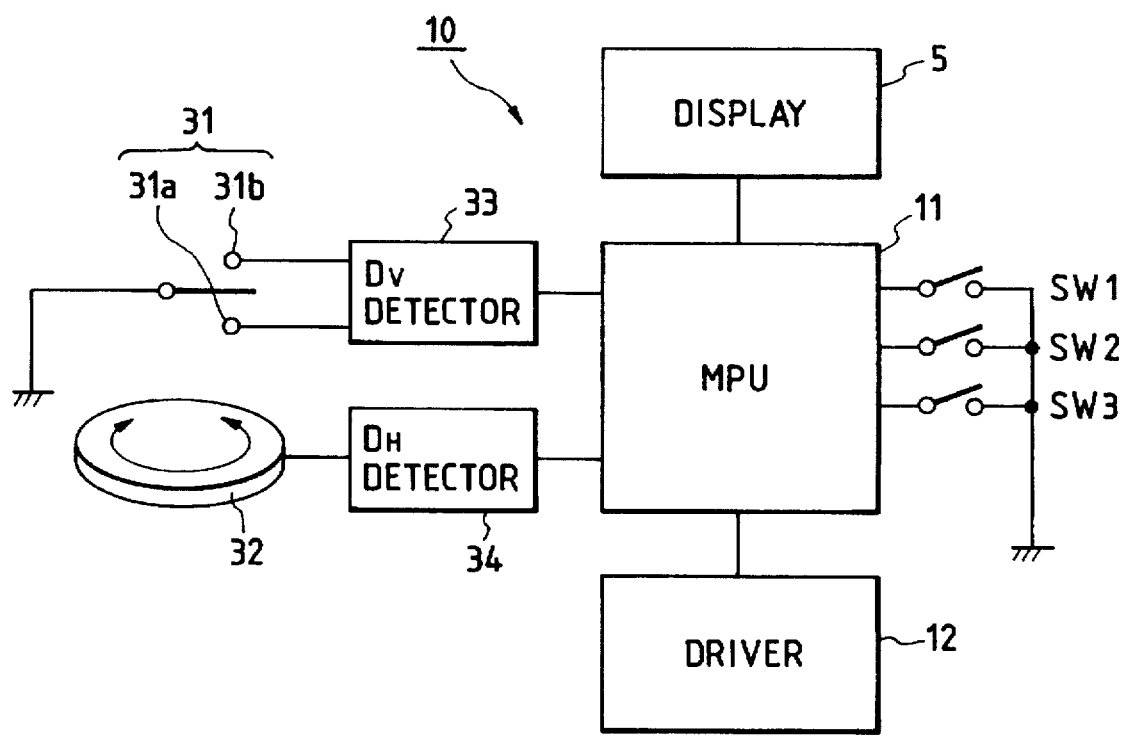
FIG. 14 is a schematic block diagram to show the major structure of the second embodiment of the information setting apparatus for a camera according to the present invention.

FIG. 14 shows the second embodiment of the apparatus 10 according to the present invention, and this second embodiment employs, as input members, an up-down control button 31 consisting of two switches 31a, 31b, and a dial type rotation manipulation member (setting dial) 32.

The apparatus is so arranged that an output from the up-down control button 31 is put into the MPU 11 through $D_V$ detecting unit 33 and an output from the rotation manipulation member 32 is put into the MPU 11 through $D_H$ detecting unit 34.

Here, the processing in the case of the second embodiment is the same as that of FIGS. 9 to 13 in the previous embodiment. The second embodiment does not need the processing of FIGS. 7 and 8. Following Table 2 shows the details of setting by the dial 32 and the up-down control button 31 in this embodiment.

TABLE 2

| Exposure mode | Dial | Up-down button |
|---|---|---|
| P | Program shift | Exposure correction |
| S | Change of shutter speed | Exposure correction |
| A | Change of aperture value | Exposure correction |
| M | Change of shutter speed | Change of aperture value |

Namely, the second embodiment is so arranged that the dial rotation manipulation member 32 changes parameters requiring quick manipulation and the up-down control button 31, being the press-controllable control button, is used to set the above exposure correction as third information setting in the exposure modes other than the M mode, requiring certainty rather than quick manipulation, thereby enabling setting of information with quickness and certainty.

It is needless to mention that the present invention is by no means limited to the above structure of the embodiment, but can be properly modified or changed as to the shape, the structure, etc. of constituents of the information setting apparatus 10 of camera 1 as exemplified by the single-lens reflex camera.

The above embodiment illustrated the case where the exposure correction amount are set as the third information setting in the exposure modes other than the M mode, but the present invention is not limited to this embodiment; for example, the apparatus may be arranged as capable of controlling setting of various shooting information. For example, the third setting information may be changeover setting of AF/MF, etc.

Figure 15:
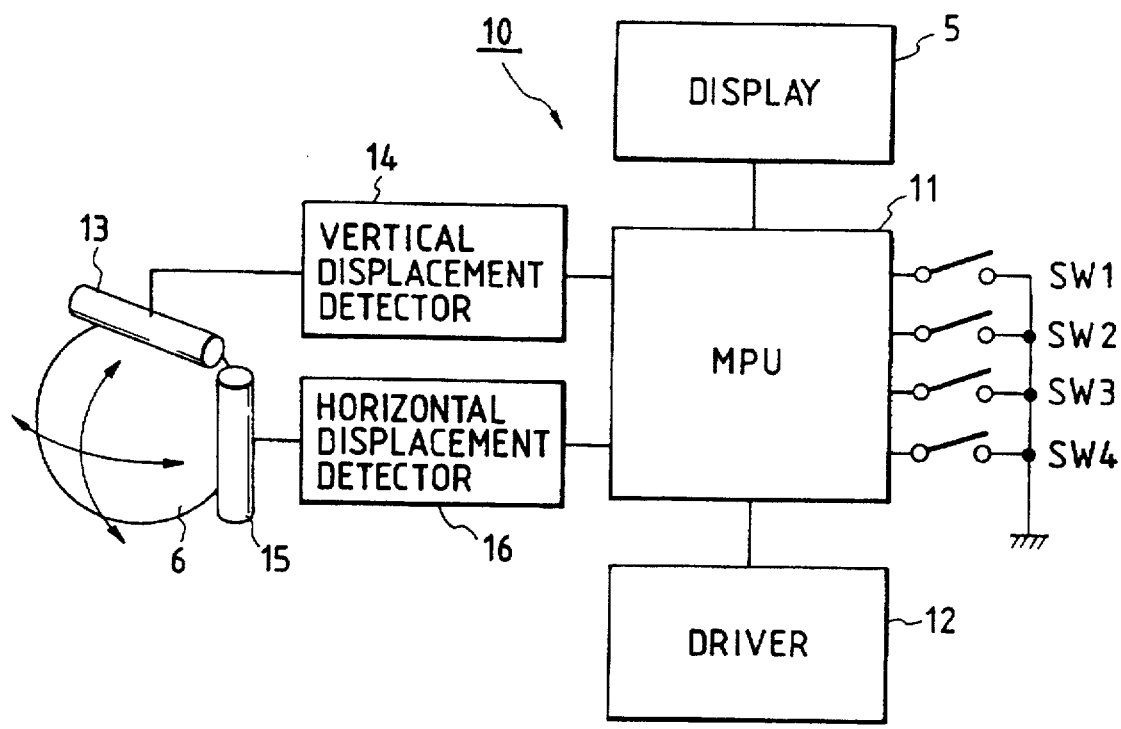
FIG. 15 is a schematic block diagram to show the major structure of the third embodiment of the information setting apparatus for a camera according to the present invention.
Figure 16:
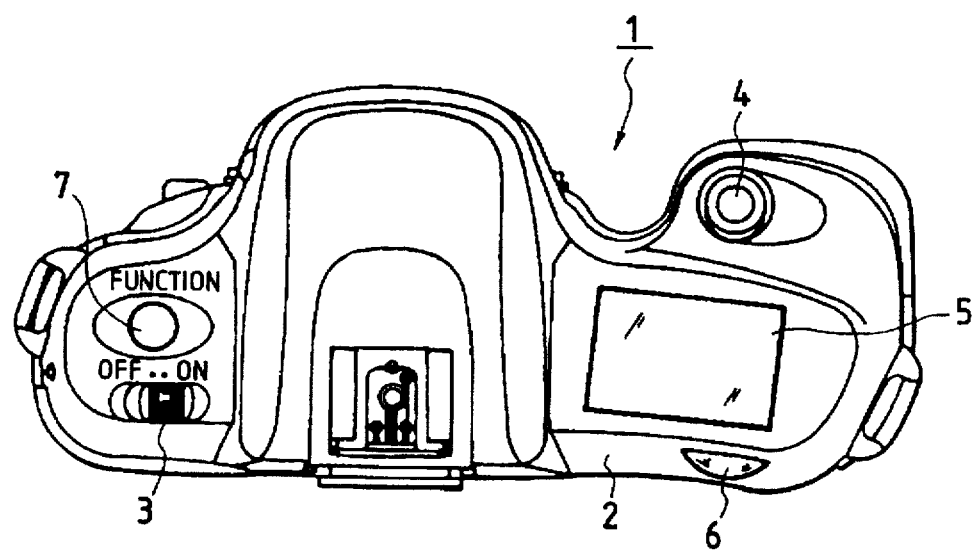
FIG. 16 is a top plan view of a camera to which the third embodiment of the information setting apparatus for a camera according to the present invention is suitably applied.

FIGS. 15 to 19 show the third embodiment of the information setting apparatus for a camera according to the present invention, and the camera to which the third embodiment is applied is substantially the same as the previous camera to which the first embodiment is applied, as shown in FIG. 2, except that a control button 7 is added as shown in FIG. 16. Thus, the description will be omitted for the structure except for the control button 7 in the camera 1 shown in FIG. 16.

The control button 7 is a function button manipulated upon selecting or setting shooting information, which is a manipulation member different from the above-described track ball 6 and which is arranged as controllable in combination with the track ball 6 to maximize utilization of the manipulated objects by the track ball 6.

In this case, this control button 7 is arranged to set suitable information by rotating the track ball in either direction while depressing the control button 7, as detailed below.

FIG. 15 is a block diagram of the major structure of the third embodiment of the information setting apparatus for a camera according to the present invention, and the information setting apparatus 10 of the third embodiment is substantially the same as that of the first embodiment shown in FIG. 1 except that a control switch SW4, which is arranged to be turned on when the control button 7 is depressed, is added thereto.

Figure 17:
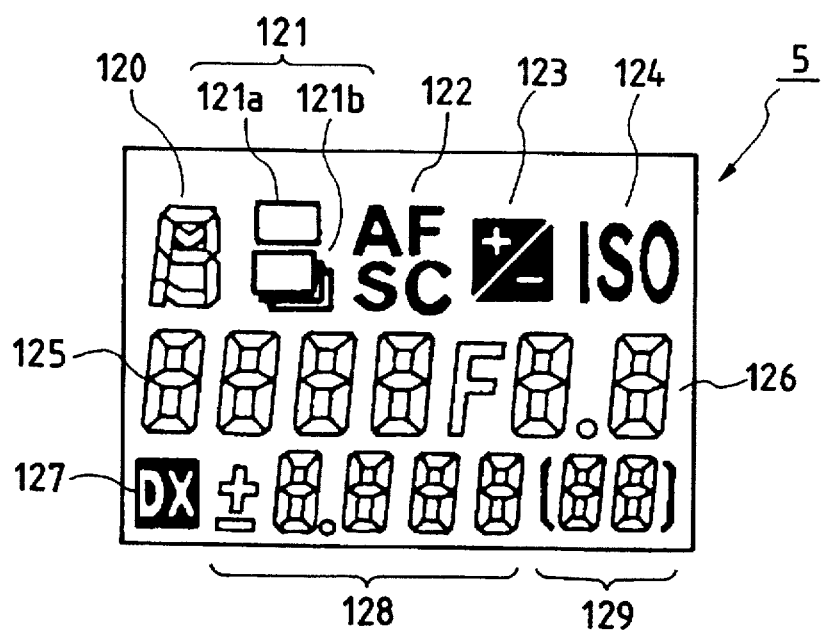
FIG. 17 is a schematic drawing of a case where all display elements are turned on in the display means in the third embodiment of the information setting apparatus for a camera according to the present invention.

FIG. 17 shows a case where all display elements are turned on in the display panel 5 in the third embodiment.

Here, reference numerals 120 to 124 represent setting and display portions of shooting information, the details of which are as follows.

Specifically, reference numeral 120 designates an exposure mode display portion, which is arranged to display "P" indicating the program auto, "S" indicating the shutter priority auto, "A" indicating the aperture priority auto, and "M" indicating the manual exposure.

Reference numeral 121 denotes a continuous shot on/off display portion, which displays either one of a symbol 121b indicating continuous shooting and a symbol 121a indicating one-shot shooting. Further, reference numeral 122 denotes a display portion for indicating a state of selection between continuous operation and one-shot operation of autofocus drive, which displays "AF-C" for continuous operation (continuous AF) or "AF-S" for single-shot operation (single AF). In addition, reference numeral 123 represents a mark for indicating setting of exposure correction, and reference numeral 124 a mark which is arranged to light upon setting of film speed.

Moreover, reference numerals 125 and 126 represent exposure information display portions of the shutter speed and aperture value, wherein the shutter speed is indicated in the display portion 125 and the aperture value in the display portion 126. Reference numeral 127 is a mark which is arranged to light in case of DX auto of film speed, numeral 128 a display portion for displaying the details of exposure correction and film speed upon setting thereof, and numeral 129 a display portion for indicating the number of film frames.

Next described is a method for inputting information in the third embodiment. Here, Table 3 shows parameters changing when the track ball 6 is rotated in each of the exposure modes of "P", "S", "A", and "M".

TABLE 3

| Exposure mode | Horizontal rotation | Vertical rotation | Oblique rotation |
|---|---|---|---|
| P | Program shift | Ignored | Regarded as horizontal rotation |
| S | Change of shutter speed | Ignored | Regarded as horizontal rotation |
| A | Ignored | Change of aperture value | Regarded as vertical rotation |
| M | Change of shutter speed | Change of aperture value | Simultaneous change of shutter speed and aperture value |

In detail, when the exposure mode is "P", horizontal rotation of the track ball 6 changes the combination of the shutter speed with the aperture value without changing exposure, thus effecting the so-called program shift. Vertical rotation is ignored. Further, oblique rotation effects the program shift using only a horizontal component thereof.

When the exposure mode is "S", horizontal rotation of the track ball 6 changes the shutter speed. Also, vertical rotation is ignored. Further, oblique rotation changes the shutter speed using only a horizontal component thereof.

When the exposure mode is "A", vertical rotation of the track ball 6 changes the aperture value. Also, horizontal rotation is ignored herein. Further, oblique rotation changes the aperture value using only a vertical component thereof.

When the exposure mode is "M", horizontal rotation of the track ball 6 changes the shutter speed, while vertical rotation changes the aperture value. Further, oblique rotation simultaneously changes the shutter speed and the aperture value.

Figure 18:
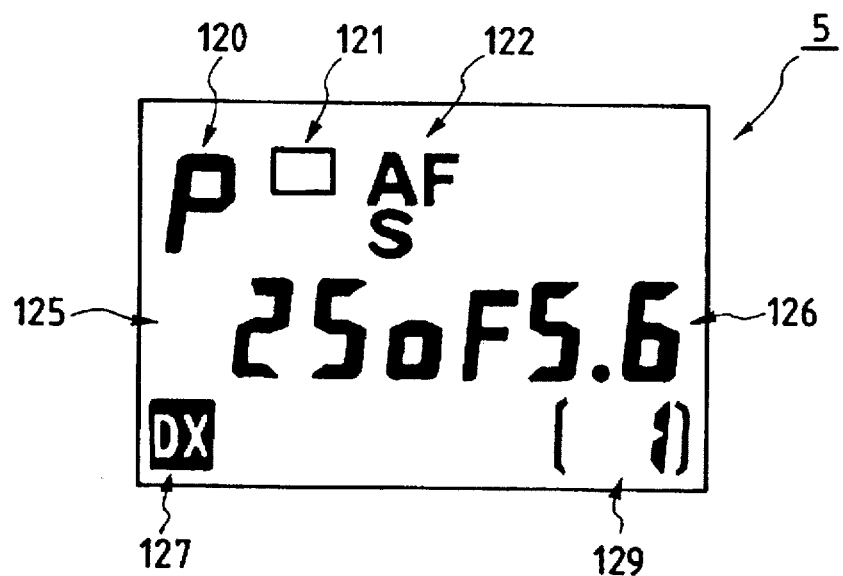
FIG. 18 is a drawing to show an example of a display state in the display means of FIG. 17.

FIG. 18 shows a display state of the display panel 5 in the third embodiment. FIG. 18 shows a case where the exposure mode is "P". In the other exposure modes only the exposure mode display portion 120 changes, but the other indications are the same.

Here, the exposure mode display portion 120 displays "P", which is the current exposure mode. The continuous shot on/off display portion 121 lights the symbol 121a indicating one-shot shooting, thus indicating that the one-shot shooting mode is set. Also, the autofocus (AF) drive mode display portion 122 lights "AF-S", thus indicating that drive is single-shot drive.

Further, the shutter speed display portion 125 and aperture display portion 126 display current shutter speed and aperture value, respectively. In addition, turned on are the mark 127 indicating that the film speed setting is the DX auto, and the film frame number display portion 129.

Since the track ball 6 is projecting a little out of the camera body 2, as apparent from FIG. 16, a preferred embodiment may be so arranged that the track ball is shaped in the contour of the camera body 2 in order to prevent the user from erroneously rotating it or that the track ball will not rotate unless the user actively rotates it. In another example, the track ball 6 may be arranged to be rotated while being depressed upon manipulation.

Next described are the cases where the track ball 6 is rotated while the control button 7 is depressed. Here, Table 4 shows the details of changes in the cases. Also, FIGS. 19A to 19E show indications in the respective cases.

TABLE 4

Figure 19A:
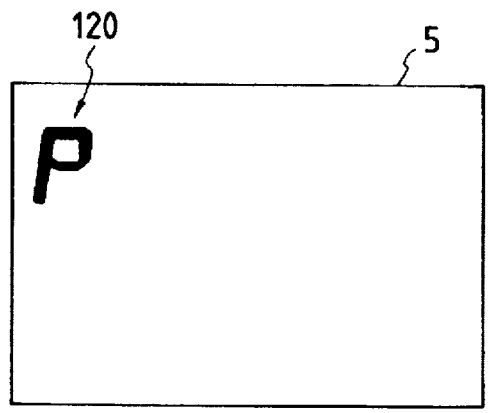
FIGS. 19A to 19E are drawings to show display states upon setting in the respective modes in the display means of FIG. 17.
Figure 19B:
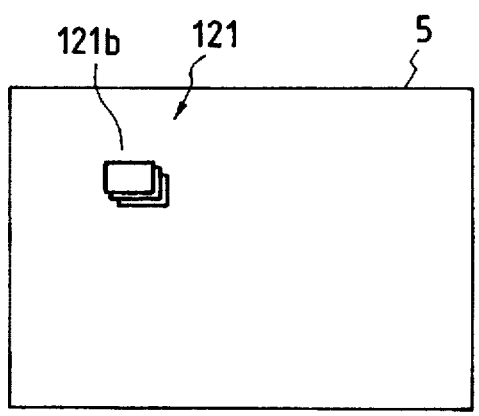
Figure 19C:
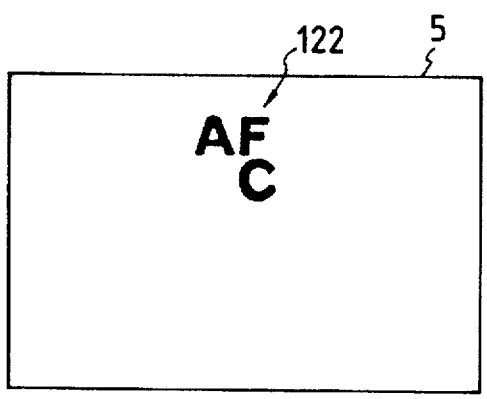
Figure 19D:
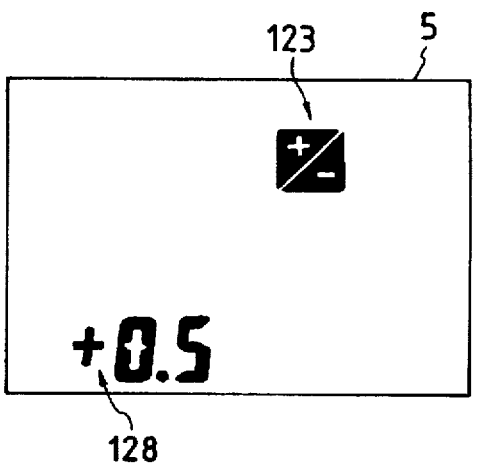
Figure 19E:
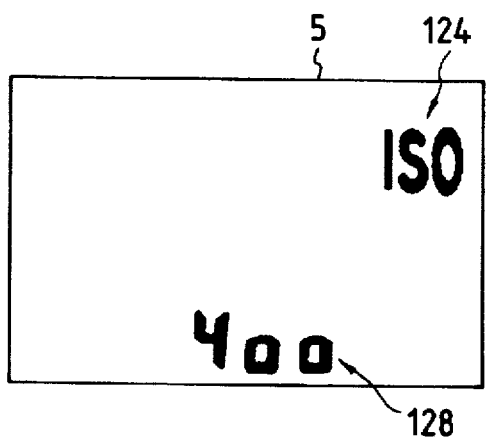

| Selection mode | Horizontal rotation | Vertical rotation | Oblique rotation | Display |
|---|---|---|---|---|
| Exposure mode setting | Change of selection mode | Change of exposure mode | Ignored | FIG. 19A |
| Continuous shot on/off selection | Change of selection mode | On/off switch | Ignored | FIG. 19B |
| AF mode selection | Change of selection mode | SC switch | Ignored | FIG. 19C |
| Exposure correction amount setting | Change of selection mode | Change of exposure amount | Ignored | FIG. 19D |
| Film speed setting | Change of selection mode | Change of film speed | Ignored | FIG. 19E |

For example, the apparatus is so arranged that horizontal rotation of the track ball 6 with depressing the control button 7 sequentially selects one of the selection modes of exposure mode setting, continuous shot on/off selection, AF mode selection, exposure correction amount setting, and film speed setting. Further, vertical rotation of the track ball 6 in each of the selection modes changes the contents thereof.

When the control button 7 is first depressed, the apparatus goes into in a state of exposure mode setting to display the indication of FIG. 19A. When the track ball 6 is horizontally rotated in this state, the five selection modes listed in Table 4 are sequentially selected. Reverse rotation in the horizontal direction changes the selection modes backward.

When the track ball 6 is vertically rotated in the state of exposure mode setting, the exposure mode changes in the order of "P", "S", "A", and "M", and the exposure mode is displayed in the exposure mode display portion 120. Reverse rotation in the vertical direction changes the exposure modes backward.

If the control button 7 is released at the point of a desired exposure mode, that exposure mode is selected and the display returns to the state of FIG. 18. If the track ball 6 is horizontally rotated at the point of the desired exposure mode, the exposure mode is fixed and then the selection mode is transferred to the next selection mode.

When the track ball 6 is vertically rotated in the state of continuous shot on/off selection, selection is switched alternately between the continuous shooting 121b and the single-shot shooting 121a, which is displayed in the display portion 121, as shown in FIG. 19B. Here, the same operation is performed in case of reverse rotation in the vertical direction.

If the control button 7 is released at the point of a desired mode, the mode is selected and the display returns to the state of FIG. 18. If the track ball 6 is horizontally rotated at the point of the desired mode, the mode is fixed and then the selection mode transfers to the next selection mode.

When the track ball 6 is vertically rotated in the state of AF mode selection, selection is switched alternately between the continuous drive "AF-C" and the single-shot drive "AF-S", which is displayed in the display portion 122, as shown in FIG. 19C. Here, the same operation is effected in case of reverse rotation in the vertical direction.

If the control button 7 is released at the point of a desired mode, the mode is selected and the display returns to the state of FIG. 18. If the track ball 6 is horizontally rotated at the point of the desired mode, the mode is fixed and then the selection mode transfers to the next selection mode.

When the track ball 6 is vertically rotated in the state of exposure correction amount setting shown in FIG. 19D where the exposure correction mark 123 is on, the exposure correction amount increases or decreases according to the rotation direction, and a value thereof is displayed in the display portion 128, as shown in FIG. 19D.

If the control button 7 is released at the point of a desired correction amount, the correction amount is set and the display returns to the state of FIG. 18. If the exposure correction amount is set at a value except for "0" in this case, the exposure correction mark 123 is turned on. If the track ball 6 is horizontally rotated at the point of the desired correction amount, the correction amount is fixed and then the selection mode transfers to the next selection mode.

When the track ball 6 is vertically rotated in the state of film speed setting shown in FIG. 19E where the film speed mark 124 is on, the film speed increases or decreases according to the rotation direction, and a value thereof is displayed in the display portion 128, as shown in FIG. 19E.

If the control button 7 is released at the point of a desired film speed, the film speed is set and the display returns to the state of FIG. 18. If the film speed is set at a value different from the film speed automatically read by DX auto in this case, the DX mark 127 is turned off. If the track ball 6 is horizontally rotated at the point of the desired film speed, the film speed is fixed and then the selection mode transfers to the next selection mode.

The apparatus is so arranged that if the track ball 6 is obliquely rotated outside a predetermined shift range in the state that the control button 7 is depressed, nothing changes.

The operation of the present third embodiment is next explained using the flowcharts of FIGS. 20 to 29.

Figure 20:
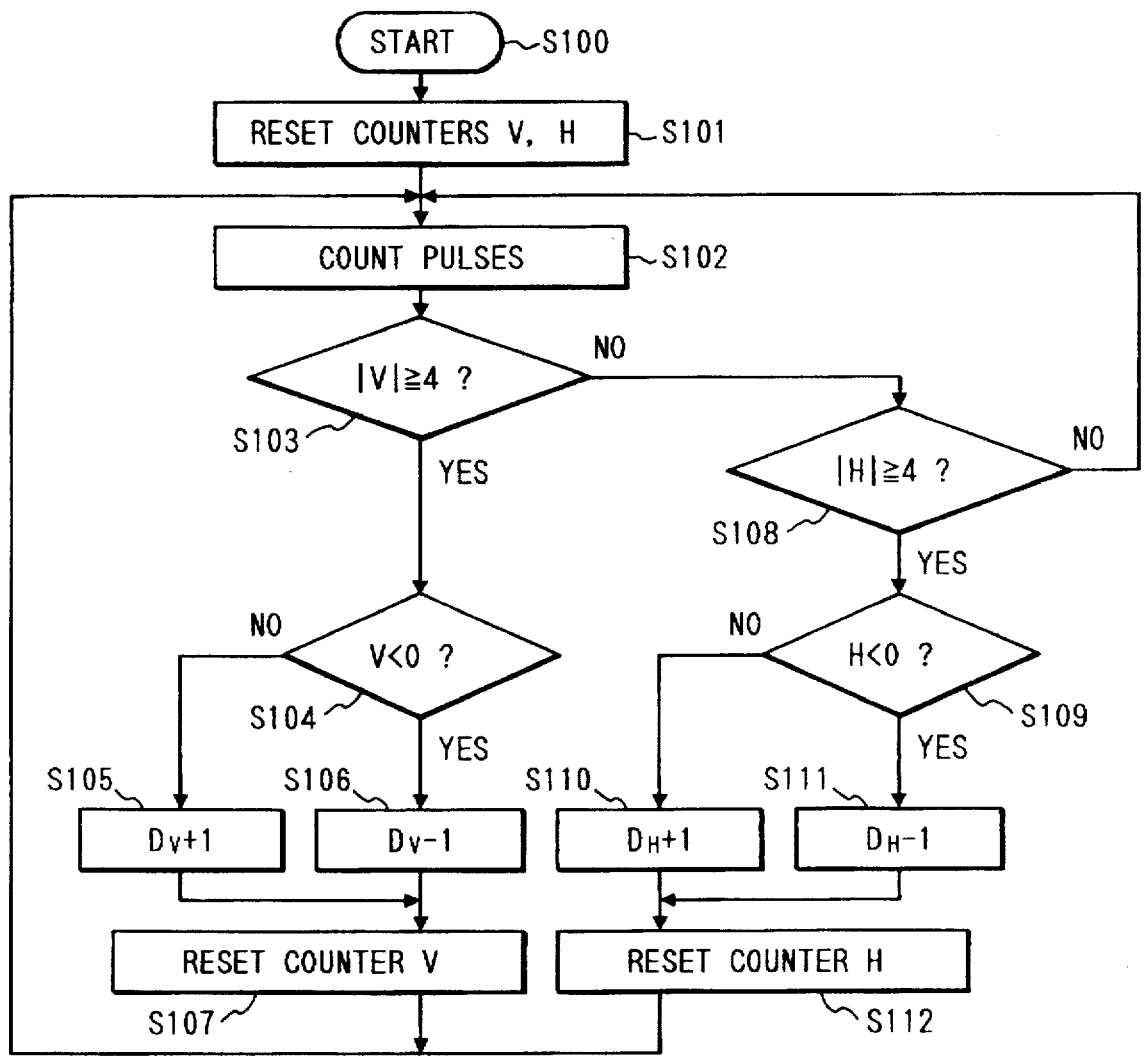
FIG. 20 is a flowchart to show an example of a detection method in the third embodiment of the information setting apparatus for a camera according to the present invention.
Figure 21:
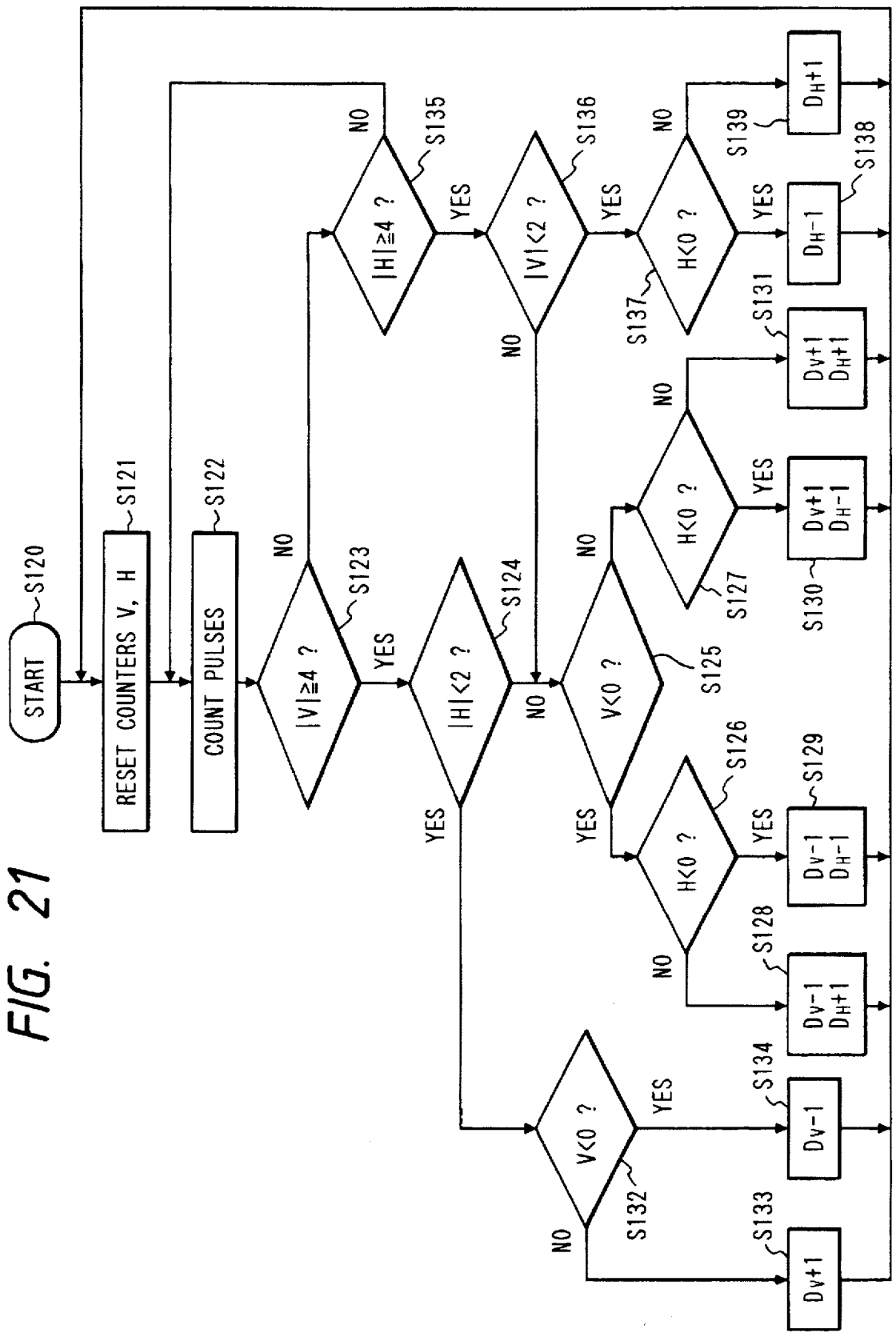
FIG. 21 is a flowchart to show another example of the detection method in the third embodiment of the information setting apparatus for a camera according to the present invention.
Figure 22:
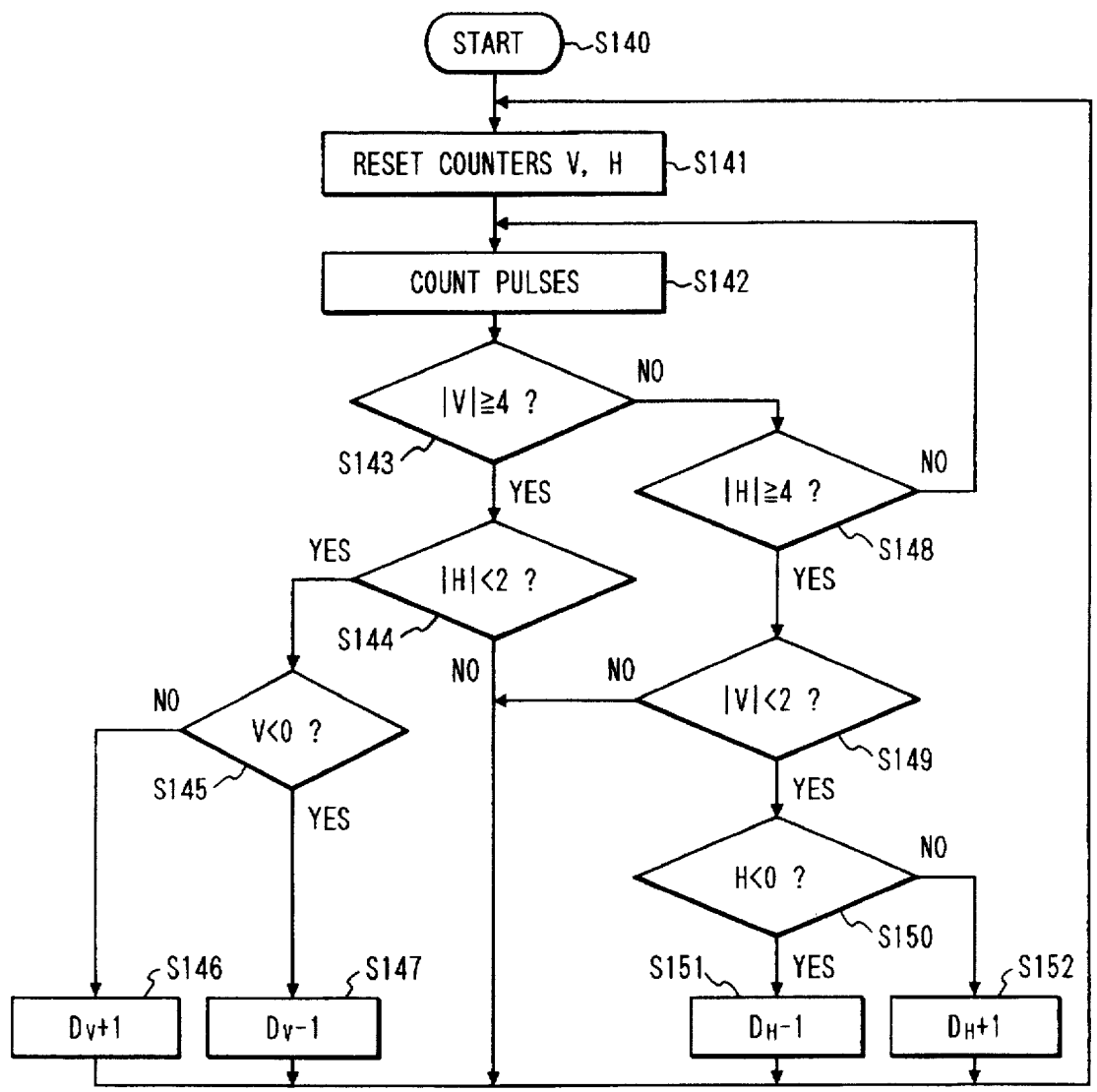
FIG. 22 is a flowchart to show still another example of the detection method in the third embodiment for a the information setting apparatus for a camera according to the present invention.

Here, the flowcharts shown in FIGS. 20 to 22 show methods for detecting rotation of the track ball 6 in the present third embodiment. The present third embodiment is provided with three types of detection methods of FIGS. 20 to 22, which are used as selecting one depending upon the circumstances.

Here, the detection method shown in FIG. 20 is one for detecting a horizontal displacement and a vertical displacement independently of each other, which is used upon setting of exposure information in the P mode, the S mode, or the A mode.

Starting at S100, the processor first resets the up-down counters V and H on RAM at S101.

At S102 the processor receives signals from the vertical displacement detecting unit 14 and horizontal displacement detecting unit 16 to increase or decrease the up-down counters V and H.

At S103 it is determined whether the absolute value of the up-down counter V becomes equal to or more than four pulses. If the absolute value is not less than four pulses, the sign of the up-down counter V is checked at S104. If the sign is positive, +1 is output to the signal outputting means $D_V$ at S105; if the sign is negative, −1 is output to the signal outputting means $D_V$ at S106.

Then the processor proceeds to S107 in either case to reset the contents of the up-down counter V, and then returns to S102.

On the other hand, if the absolute value of the up-down counter V is less than four pulses at S103, the processor proceeds to S108 to determine whether the absolute value of the up-down counter H becomes equal to or more than four pulses. If the absolute value is not less than four pulses, the sign of the up-down counter H is checked at S109. If the sign is positive, +1 is output to the signal outputting means $D_H$ at S110; if the sign is negative, −1 is output to the signal outputting means $D_H$ at S111.

Then the processor proceeds to S112 in either case to reset the contents of the up-down counter H and then returns to S102.

If the up-down counter H is also less than four pulses at S108, the processor immediately returns to S102 to continue detection of pulses.

Here, the above MPU 11 is so arranged that even if a rotation direction of the track ball 6 as the manipulation detecting means is a little shifted from the two mutually orthogonal directions for obtaining first and second signals consisting of at least plural pulses, the MPU performs only change of either one parameter as long as the ratio of these first and second signals is within a certain range.

This arrangement is advantageous in respect of operability because the photographer need not pay special attention to the direction of rotation manipulation of the track ball 6.

The detection method shown in FIG. 21 is a method for also detecting an oblique displacement in addition to the horizontal displacement and vertical displacement, which is used upon setting of exposure information in the M mode. Since the flowchart shown in FIG. 21 is the same as that shown in FIG. 7, the description thereof is omitted herein.

The detection method shown in FIG. 22 is one for detecting only the horizontal displacement and the vertical displacement, but ignoring the oblique displacement, which is used upon setting of shooting information. Since the flowchart shown in FIG. 22 is the same as that shown in FIG. 8, the description thereof is omitted herein.

Figure 23B:
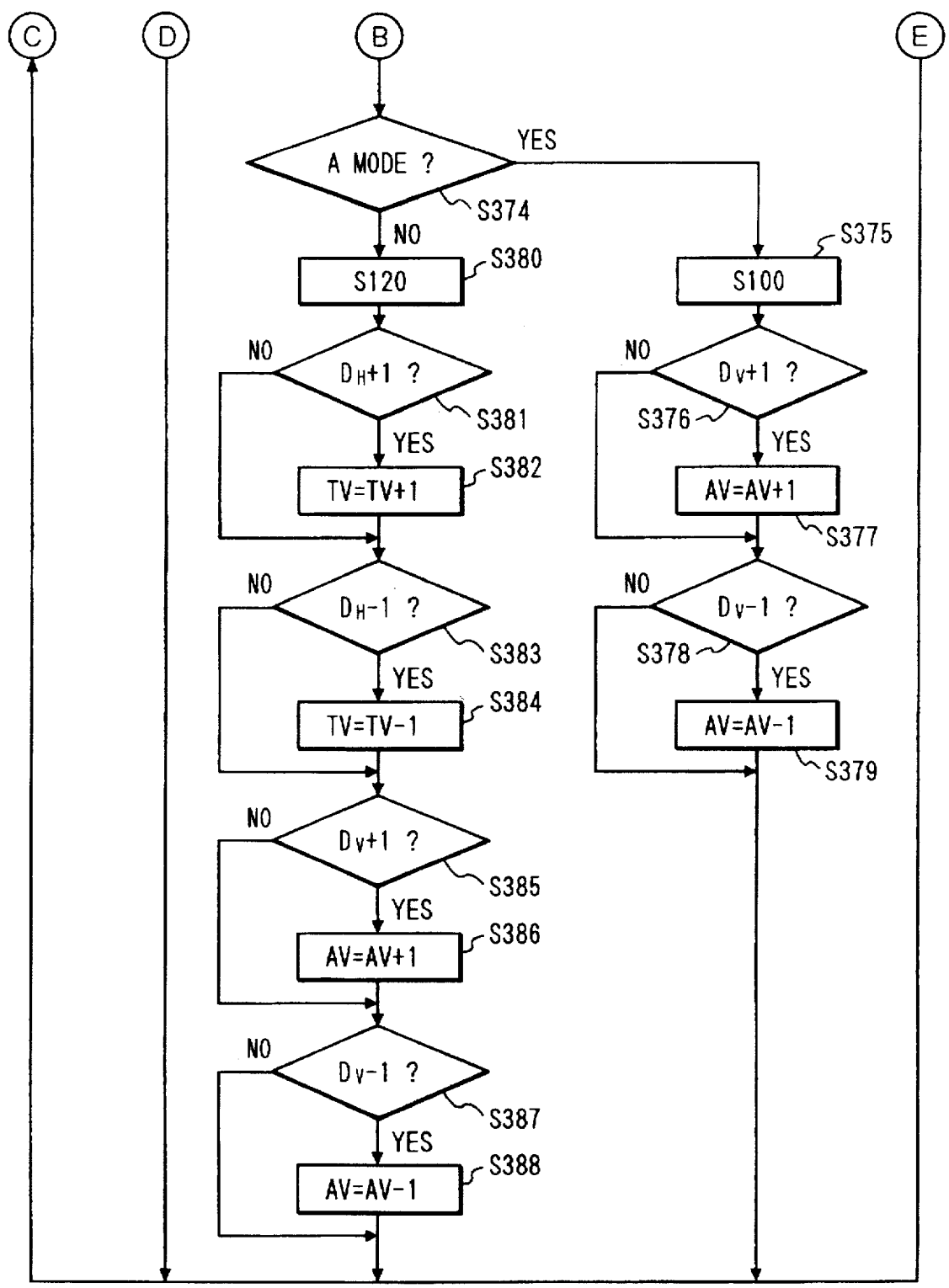
FIG. 23 is comprised of FIGS. 23A to 23C showing a flowchart to illustrate an example of information setting processing in various exposure modes in the third embodiment of the information setting apparatus for a camera according to the present invention.

FIG. 23 shows processing of exposure information setting in each of the exposure modes, applied to the third embodiment.

Starting at S360, the processor checks at S361 the state of the switch SW4 arranged to become on when the control button 7 as described above is depressed.

Here, the processor lumps to the processing of S401 and steps thereafter in FIG. 23C as detailed below, if the switch SW4 is on, that is, if the control button 7 is depressed.

If the switch SW4 is off, whether the P mode is selected is determined at S362. If the P mode is selected the processor proceeds to S363 to execute the detection processing of the track ball 6 of S100 and steps thereafter shown in FIG. 20 described previously.

When this detection results in outputting +1 to the signal outputting means $D_H$, the processor changes the shutter speed and aperture value each by one step in opposite directions at S365, thus effecting the program shift.

Similarly, if −1 is output to the signal outputting means $D_H$, the reverse program shift to that at S365 is effected at S367. Then the flow returns to S361. If the P mode is selected, the processor ignores a vertical change of the track ball 6, i.e., an output from the signal outputting means $D_V$.

If any other mode than the P mode is selected at S362, the processor proceeds to S368 to judge whether the S mode is selected. If the S mode is selected the processor proceeds to S369 to execute the detection processing of track ball 6 of S100 and steps thereafter shown in FIG. 20 described previously.

When this detection results in outputting +1 to the signal outputting means $D_H$, the shutter speed is changed by one step at S371.

Similarly, if −1 is output to the signal outputting means $D_H$, the processor changes at S373 the shutter speed by one step in the opposite direction to that at S371. Then the flow returns to S361. If the S mode is selected, the processor ignores a vertical change of the track ball 6, i.e., an output from the signal outputting means $D_V$.

If any other mode than the S mode is selected at S368, the flow proceeds to S374 to judge whether the A mode is selected. If the A mode is selected the processor proceeds to S375 to execute the detection processing of the track ball 6 of S100 and steps thereafter shown in FIG. 20 described previously.

When this detection results in outputting +1 to the signal outputting means $D_V$, the processor changes the aperture value by one step at S377.

Similarly, when −1 is output to the signal outputting means $D_V$, the processor changes at S379 the aperture value by one step in the opposite direction to that at S377. Then the flow returns to S361. If the A mode is selected, the processor ignores a horizontal change of the track ball 6, that is, an output from the signal outputting means $D_H$.

If the A mode is not selected at S374, the processor judges that the M mode is selected and proceeds to S380 to execute the detection processing of the track ball 6 of S120 and steps thereafter shown in FIG. 21 described previously.

When this detection results in outputting +1 to the signal outputting means $D_H$, the processor changes the shutter speed by one step at S382.

Similarly, when −1 is output to the signal outputting means $D_H$, the processor changes at S384 the shutter speed by one step in the opposite direction to that at S382. When +1 is output to the signal outputting means $D_V$, the processor changes the aperture value by one step at S386.

Further, similarly, if −1 is output to the signal outputting means $D_V$, the processor changes at S388 the aperture value by one step in the opposite direction to that at S386. Then the flow returns to S361.

As described, horizontal rotation of the track ball 6 changes the shutter speed and vertical rotation changes the aperture value in the M mode. As described in the explanation of FIG. 7 (or FIG. 21), the shutter speed and aperture value can be increased or decreased in the relation of 1:1 in case of oblique rotation.

When the switch SW4 is on at S361, the processor proceeds to S401 to execute the detection processing of the track ball 6 of S140 and steps thereafter shown in FIG. 22 described previously.

When this detection results in outputting +1 or −1 to the signal outputting means $D_H$, the processor sequentially changes the selection mode at S403 as selecting one from the five modes in Table 4.

If there is no output to the signal outputting means $D_H$, the processor proceeds to S404 to determine whether the state of exposure mode setting is effective. If the state of exposure mode setting is effective, the processor proceeds to S405 to call the subroutine of S420 and then returns to S402.

Further, if the state of exposure mode setting is not effective at S404, the processor proceeds to S406 to determine whether the state of continuous shot on/off selection is effective. Then, if the state of continuous shot on/off selection is effective, the processor proceeds to S407 to call the subroutine of S430 and then returns to S402.

If the state of continuous shot on/off selection is not effective at S406, the processor proceeds to S408 to determine whether the state of AF mode selection is effective. If the state of AF mode selection is effective, the processor proceeds to S409 to call the subroutine of S440 and then returns to S402.

Further, if the state of AF mode selection is not effective at S408, the processor proceeds to S410 to determine whether the state of exposure correction amount setting is effective. If the state of exposure correction amount setting is effective, the processor proceeds to S411 to call the subroutine of S450 and then returns to S402.

If the state of exposure correction amount setting is not effective at S410, the processor determines that the state of film speed setting is effective and proceeds to S412 to call the subroutine of S460 and then returns to S402.

Figure 23C:
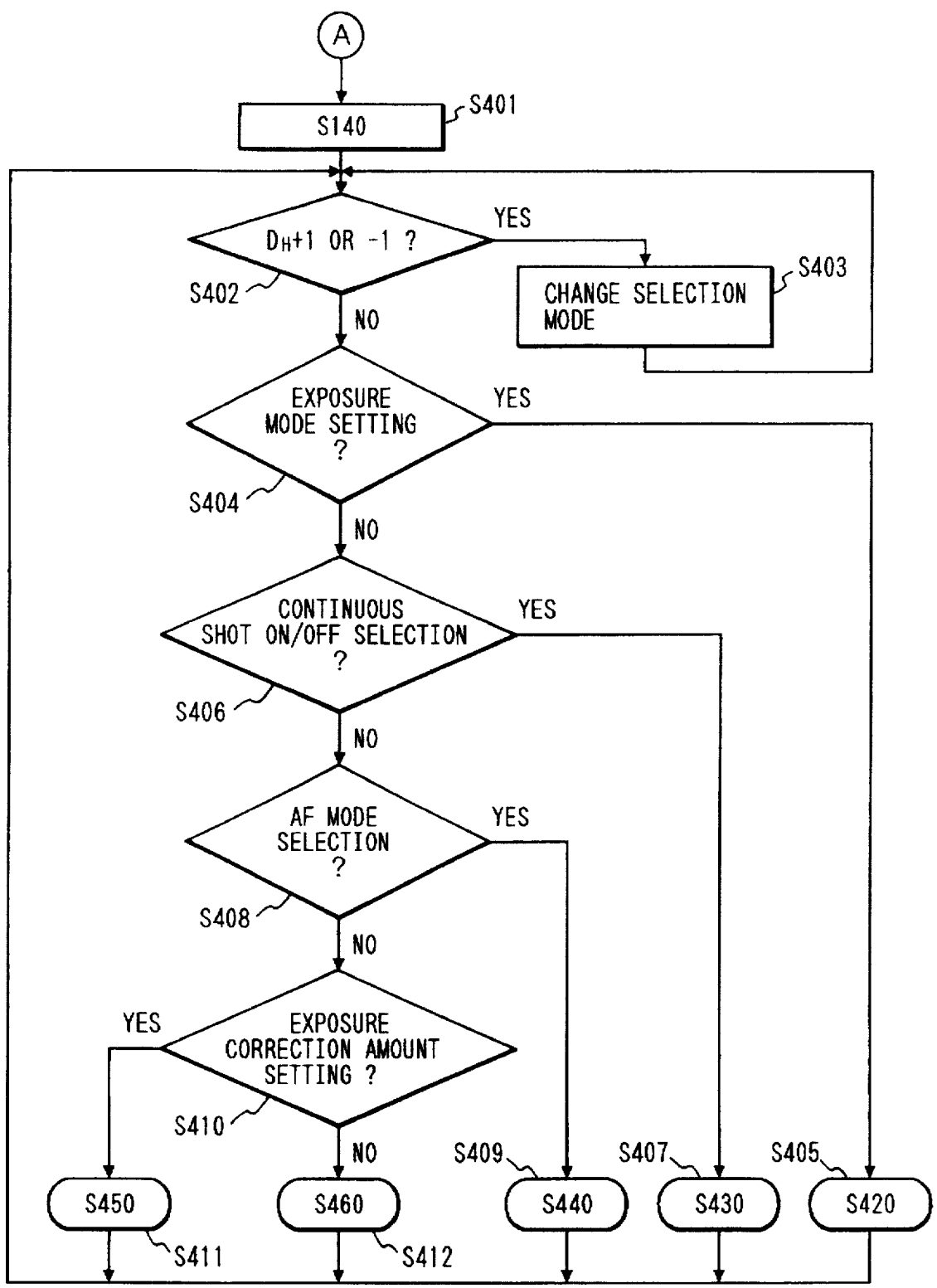
Figure 24:
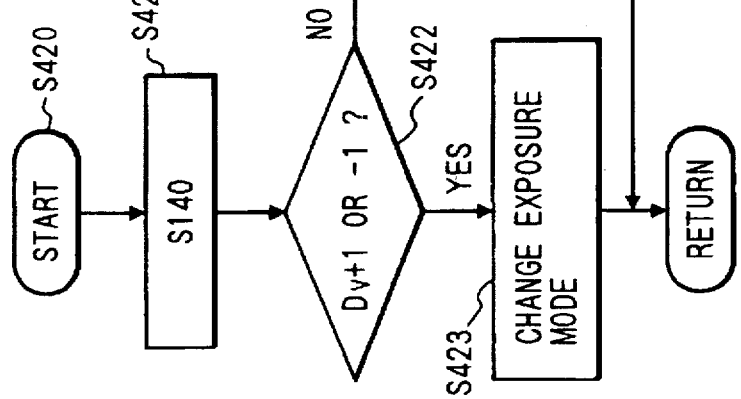
FIG. 24 is a flowchart to show a subroutine called at S405 in FIG. 23C.

FIG. 24 shows the subroutine called at S405 in FIG. 23C.

Starting at S420, the processor executes at S421 the detection processing of S140 and steps thereafter in FIG. 22, similarly as described previously, and then determines at S422 whether +1 or −1 is output to the signal outputting means $D_V$.

If there is an output to the signal outputting means $D_V$, the processor changes the exposure mode according to it as sequentially selecting one of those in Table 3 and displays the result in the exposure mode display portion 120. FIG. 19A shows an example where the P mode is selected. After that, the processor returns to the main flow. If there is no output to the signal outputting means $D_V$, the processor immediately returns to the main flow.

Figure 25:
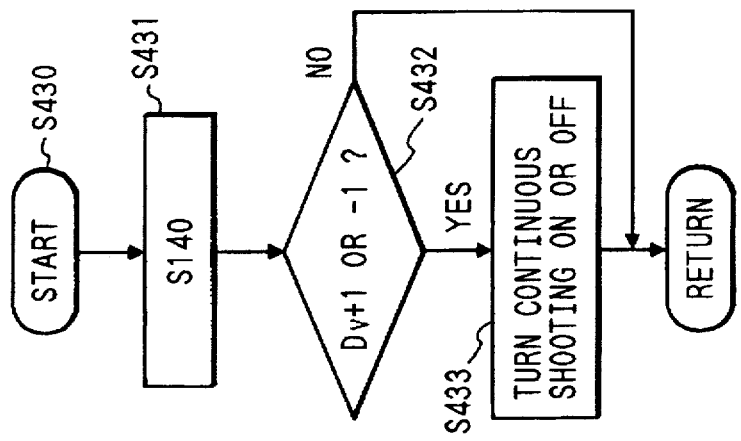
FIG. 25 is a flowchart to show a subroutine called at S407 in FIG. 23C.

FIG. 25 shows the subroutine called at S407 in FIG. 23C.

Starting at S430, the processor executes at S431 the detection processing of S140 and steps thereafter in FIG. 22, similarly as described previously, and then determines at S432 whether +1 or −1 is output to the signal outputting means $D_V$.

If there is an output to the signal outputting means $D_V$, the processor turns continuous shooting on or off according to the output, and displays the result in the continuous shot on/off display portion 121. FIG. 19B shows an example where the continuous shooting is on. After that, the processor returns to the main flow. If there is no output to the signal outputting means $D_V$, the processor immediately returns to the main flow.

Figure 26:
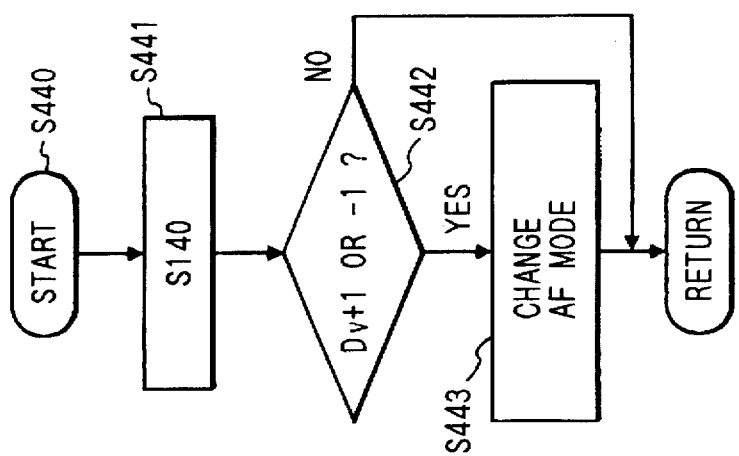
FIG. 26 is a flowchart to show a subroutine called at S409 in FIG. 23C.

FIG. 26 shows the subroutine called at S409 in FIG. 23C.

Starting at S440, the processor executes at S441 the detection processing of S140 and steps thereafter in FIG. 22, similarly as described above, and then determines at S442 whether +1 or −1 is output to the signal outputting means $D_V$.

When either output is supplied to the signal outputting means $D_V$, the processor changes the drive of the AF mode into continuous drive or single-shot drive according to the output, and displays the result in the display portion 122 for AF drive. FIG. 19C shows an example where the continuous drive is effective. After that, the flow returns to the main flow. If no output is supplied to the signal outputting means $D_V$, the flow immediately returns to the main flow.

Figure 27:
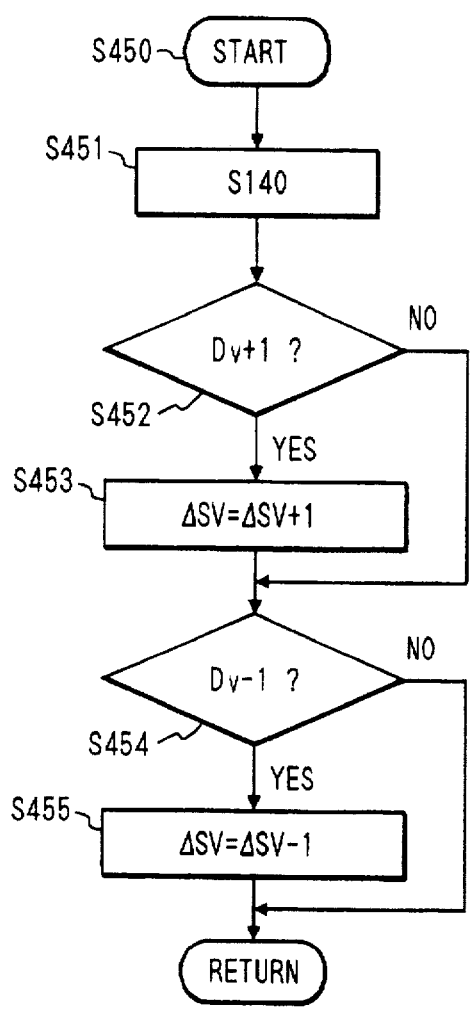
FIG. 27 is a flowchart to show a subroutine called at S411 in FIG. 23C.

FIG. 27 shows the subroutine called at S411 in FIG. 23C.

Starting at S450, the processor executes at S451 the detection processing of S140 and steps thereafter in FIG. 22, similarly as described previously, and determines at S452 whether +1 is output to the signal outputting means $D_V$. When +1 is output to the signal outputting means $D_V$, the processor changes the exposure correction amount by one step at S453, and then proceeds to S454.

If the output of +1 is absent in the signal outputting means $D_V$ at S452, the processor immediately proceeds to S454.

Next, the processor determines whether −1 is output to the signal outputting means $D_V$ at S454.

When −1 is output to the signal outputting means $D_V$, the processor changes the exposure correction amount at S455 by one step in the opposite direction to that at S453, and then returns to the main flow. If the output of −1 is absent in the signal outputting means $D_V$ at S454, the processor immediately returns to the main flow. A display state of this subroutine is shown in FIG. 19D.

Figure 28:
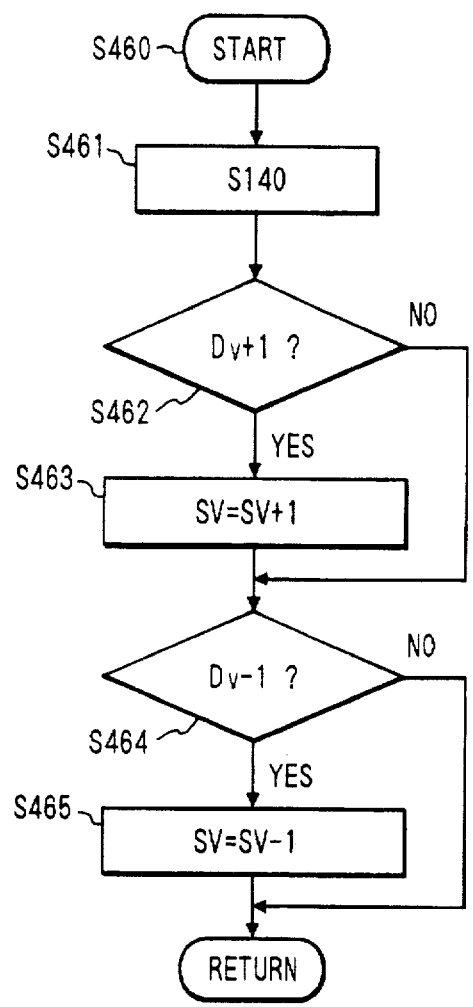
FIG. 28 is a flowchart to show a subroutine called at S412 in FIG. 23C.

FIG. 28 shows the subroutine called at S412 in FIG. 23C.

Starting at S460, the processor executes at S461 the detection processing of S140 and steps thereafter in FIG. 22, similarly as described previously, and determines at S462 whether +1 is output to the signal outputting means $D_V$. When +1 is output to the signal outputting means $D_V$, the processor changes the film speed by one step at S463, and then proceeds to S464.

If the output of +1 is absent in the signal outputting means $D_V$ at S462, the processor immediately proceeds to S464. Next, the processor determines at S464 whether −1 is output to the signal outputting means $D_V$.

When −1 is output to the signal outputting means $D_V$, the processor changes at S465 the film speed by one step in the opposite direction to that at S463, and then returns to the main flow. If the output of −1 is absent in the signal outputting means $D_V$ at S464, the processor immediately returns to the main flow. A display state of this subroutine is shown in FIG. 19E.

As described above, oblique rotation of track ball 6 is made invalid upon input of shooting information by using the detection method shown in FIG. 22, which enables sure setting of various information.

Figure 29:
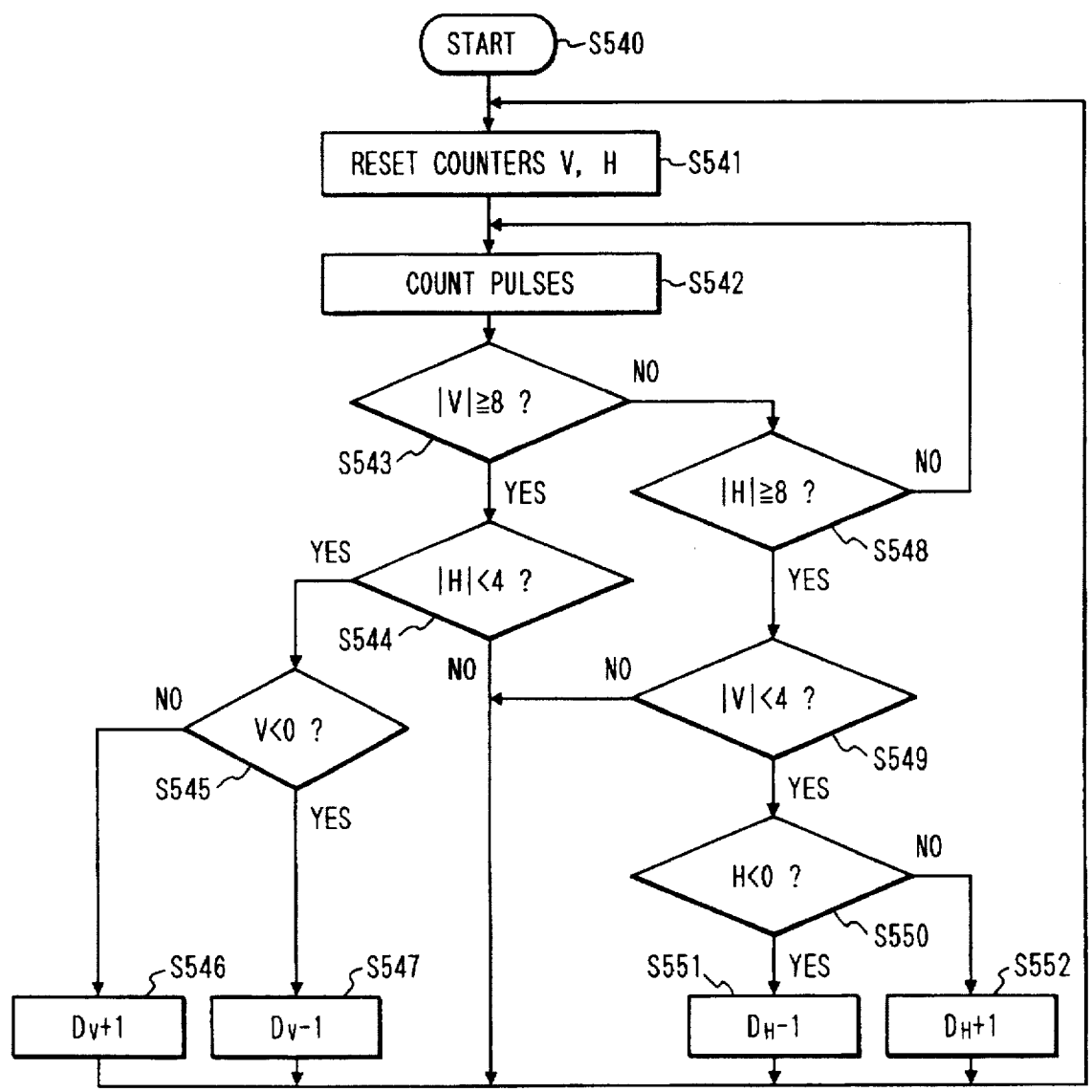
FIG. 29 is a flowchart to show another example of the detection method in the third embodiment of the information setting apparatus for a camera according to the present invention.

FIG. 29 shows another example of the detection method of FIG. 22. A difference from FIG. 22 as described above resides in that numbers of pulses of the up-down counters H and V used in the judgments at S543, S544, S548, and S549 are increased from those in FIG. 22.

The operations at respective steps of from the start of S540 to S552 are equivalent to those at S140 to S152 in FIG. 22, and thus, the detailed description thereof is omitted herein.

Such an arrangement of increasing the numbers of pulses for judgment in the above up-down counters H and V as in this embodiment increases an amount of rotation of the track ball 6 before +1 or −1 is output to the signal outputting means $D_V$ or $D_H$.

Accordingly, this embodiment can quickly change the shutter speed and the aperture value, similarly as the above embodiment, upon setting of exposure information using FIG. 20 or FIG. 21, and can permit sure setting by intentionally lowering the sensitivity of the track ball 6 upon setting of shooting information using FIG. 29.

It is needless to state that the present invention is by no means limited to the structures of the above embodiments, but may be suitably modified or changed in the shape, the structure, etc. of the constituents forming the information setting apparatus 10 of camera 1 as exemplified by the single-lens reflex camera.

For example, the third embodiment as described above may be so modified that the numbers of pulses for judgment are kept equal to those in FIG. 20 or FIG. 21, only for setting of exposure correction amount and setting of film speed in setting of shooting information. This arrangement enhances the sensitivity of track ball 6 (or increases the degree of conversion of parameter against a predetermined displacement amount of track ball 6) in changing numerical information such as the shutter speed and aperture value, the exposure correction amount, the film speed, etc., thereby enabling quick setting. For changing the condition other than the numerical information, the arrangement decreases the sensitivity of track ball 6 (or decreases the degree of conversion of parameter against a predetermined displacement amount of track ball 6), thus enabling sure setting.

Further, the above embodiments showed the examples where the spherical track ball 6 was used as the manipulation detecting means (manipulation member), but the present invention is not limited to the examples; for example, the manipulation member may be a semi-spherical track ball with a nearly flat surface as a manipulation surface, or any manipulation member can demonstrate the effect when applied as long as it can detect increase or decrease of displacement in at least two directions due to external manipulation.

Specifically, such manipulation members may include one capable of detecting a displacement in such an arrangement that a detecting member of a flat plate is arranged to have directivity by contacts such as fingers, and a joystick having a manipulation portion such as a lever, controllable in two directions.

The above embodiments illustrated the examples where the shutter speed was changed by detecting the horizontal displacement of the track ball 6 as the manipulation detecting means and the aperture value was changed by detecting the vertical displacement thereof and where the selection mode was changed by detecting the horizontal displacement of track ball 6 as depressing the control button 7 and setting in each mode was changed by detecting the vertical displacement, but the vertical displacement and the horizontal displacement may be read the other way around.

Further, the camera 1 may be provided with posture detecting means in such an arrangement that when the posture of camera 1 is changed into the vertical position or into the horizontal position, the manipulation can be made as alternately switching between the displacement detection and the setting change through the manipulation detecting means, taking account of the operability for photographer.

Therefore, it is intended that the invention not be limited to the preferred embodiments described herein, but that the invention will include all embodiments falling within the scope of the appended claims.

What is claimed is:

1. An information setting apparatus of a camera, which permits an exposure mode to be set, comprising:
    first setting means for setting a shutter speed of said camera when the exposure mode is a manual mode; and
    second setting means for setting an aperture value of said camera when the exposure mode is the manual mode,
    wherein when the exposure mode is one other than the manual mode, third information except for said shutter speed and aperture value is set by either one of said first and second setting means,
    wherein said third information is an exposure correction amount, and
    wherein said first and second setting means are a single assembly.

2. An information setting apparatus for a camera, which permits an exposure mode to be set, comprising:
    first setting means for setting a shutter speed of said camera when the exposure mode is a manual mode;
    second setting means for setting an aperture value of said camera when the exposure mode is the manual mode,
    wherein when the exposure mode is one other than the manual mode, a third information except for said shutter speed and aperture value is set by either one of said first and second setting means; and
    a display portion to display an exposure correction amount, wherein said third information is said exposure correction amount, and when the exposure mode is the manual mode, an offset amount deviated from an optimal exposure amount is displayed in said display portion.

3. An information setting apparatus of a camera, which permits an exposure mode to be set, comprising:
    first setting means for setting a shutter speed of said camera when the exposure mode is a manual mode; and
    second setting means for setting an aperture value of said camera when the exposure mode is the manual mode,
    wherein when the exposure mode is one other than the manual mode, third information except for said shutter speed and aperture value is set by either one of said first and second setting means,
    wherein said third information is an exposure correction amount, and
    wherein one setting means for setting said exposure correction amount, out of said first and second setting means, comprises a press-controllable button and the other setting means comprises a rotation manipulation member.

4. An information setting apparatus for a camera, which permits an exposure mode to be set, comprising:
    first setting means for setting a shutter speed of said camera when the exposure mode is a manual mode; and
    second setting means for setting an aperture value of said camera when the exposure mode is the manual mode;
    wherein when the exposure mode is one other than the manual mode, third information except for said shutter speed and aperture value is set by either one of said first and second setting means,
    wherein said third information is said exposure correction amount, and
    wherein said first and second setting means include a manipulation member arranged as capable of being displaced in any direction, and manipulation detecting means for detecting each of continuous displacements of said manipulation member in two substantially orthogonal directions and in a direction between said two directions and wherein a displacement in one direction out of said two orthogonal directions effects setting of the shutter speed of said camera while a displacement in the other direction effects setting of the aperture value of said camera.

5. An information setting apparatus for a camera according to claim 4, wherein where the exposure mode is the manual mode and when said manipulation detecting means simultaneously detects the displacements of said manipulation member in said two directions, setting of the shutter speed and the aperture value of said camera is changed at a ratio of 1:1 while a setting operation through said manipulation member is ignored in case of an exposure mode other than said manual mode.

6. An information setting apparatus for a camera according to claim 4, wherein said manipulation member is a track ball capable of being rotation-displaced in any direction.

7. An information setting apparatus for a camera, comprising:
    an externally controllable manipulation member, which is capable of being displaced in any direction;

manipulation detecting means for detecting increases or decreases of each of displacements in at least two directions of said manipulation member; and controlling means for changing a shutter speed and an aperture value of said camera in accordance with the displacement in one direction and the displacement in the other direction of said manipulation member, detected by said manipulation detecting means.

8. An information setting apparatus for a camera according to claim 7, wherein said manipulation member is a track ball capable of being rotation-displaced in any direction.

9. An information setting apparatus for a camera, comprising:

a first manipulation member being externally controllable and capable of being displaced in any direction;

manipulation detecting means for detecting increases or decreases of displacements in at least two directions of said first manipulation member;

a second manipulation member provided separately from said first manipulation member; and controlling means for controlling the information setting apparatus, said controlling means arranged in such a manner that where said second manipulation member is not manipulated, said controlling means changes each of a shutter speed and an aperture value of said camera in accordance with a displacement in one direction and a displacement in an other direction, of said first manipulation member, detected by said manipulation detecting means and that where said second manipulation member is manipulated, said controlling means performs selection of changeable shooting information except for the shutter speed and the aperture value of said camera in accordance with a displacement in one direction, of said first manipulation member, detected by said manipulation detecting means and also changes the contents of the shooting information selected, in accordance with a displacement in the other direction.

10. An information setting apparatus for a camera according to claim 9, wherein said first manipulation member is a track ball capable of being rotation-displaced in any direction.

11. An information setting apparatus for a camera, comprising:

a manipulation member being externally controllable and capable of being displaced in any direction;

manipulation detecting means which can detect a displacement of said manipulation member given by a photographer;

first outputting means for outputting a displacement signal according to the displacement of said manipulation member from a detection result of said manipulation detecting means;

second outputting means for outputting a conversion signal for effecting conversion of a shooting parameter of said camera, based on the displacement signal output from said first outputting means;

controlling means for converting the shooting parameter of said camera according to the conversion signal output from said second outputting means; and ratio changing means for changing a ratio between the displacement signal output from said first outputting means and the conversion signal output from said second outputting means.

12. An information setting apparatus for a camera according to claim 11, wherein if the shooting parameter to be changed is either one of a shutter speed and an aperture value, said ratio changing means changes the ratio so that an amount of conversion of the shooting parameter for the displacement of said manipulation member becomes greater than those in the other cases.

13. An information setting apparatus for a camera according to claim 11, wherein if the shooting parameter to be converted is numerical information, said ratio changing means changes the ratio so that an amount of conversion of the shooting parameter for the displacement of said manipulation member becomes greater than those in the other cases.

14. An information setting apparatus for a camera according to claim 11, wherein said manipulation member is a track ball capable of being rotation-displaced in any direction.

15. An information setting apparatus for a camera, comprising:

a manipulation member being externally controllable and capable of being displaced in any direction;

manipulation detecting means for detecting each of continuous displacements of said manipulation member in two substantially mutually orthogonal directions and in a direction between said two directions to output detection signals;

signal outputting means for outputting a first signal consisting of plural pulses as a displacement component in one direction out of said two orthogonal directions and outputting a second signal consisting of plural pulses as a displacement component in the other direction, based on the detection signals output from said manipulation detecting means; and controlling means for updating first and second shooting parameters of said camera, based on said first and second signals, said controlling means being so arranged that when a ratio between said first signal and said second signal is within a first range, said controlling means updates only said first shooting parameter and that when the ratio between said first signal and said second signal is within a second range different from said first range, said controlling means updates only said second shooting parameter.

16. An information setting apparatus for a camera according to claim 15, wherein said controlling means inhibits updating of either of said first and second shooting parameters if the ratio between said first signal and said second signal is within a third range outside said first and second ranges.

17. An information setting apparatus for a camera according to claim 15, wherein said controlling means updates said first shooting parameter and said second shooting parameter at a ratio of 1:1 if the ratio between said first signal and said second signal is within a third range outside said first and second ranges.

18. An information setting apparatus for a camera according to claim 15, wherein said first and second shooting parameters are a shutter speed and an aperture value of said camera, respectively.

19. An information setting apparatus for a camera according to claim 15, wherein said manipulation member is a track ball capable of being rotation-displaced in any direction.

* * * * *

UNITED STATES PATENT AND TRADEMARK OFFICE
CERTIFICATE OF CORRECTION

PATENT NO. : 5,687,410
DATED : November 11, 1997
INVENTOR(S) : Nobuaki SASAGAKI

It is certified that error appears in the above-identified patent and that said Letters Patent is hereby corrected as shown below:

Col. 25, Claim 11, line 47, change "which can detect" to --for detecting--;
Col. 26, Claim 12, line 7, delete "the".

Signed and Sealed this

Thirty-first Day of March, 1998

Attest:

BRUCE LEHMAN

Attesting Officer

Commissioner of Patents and Trademarks